US006633465B2

(12) United States Patent
Hoshiya et al.

(10) Patent No.: US 6,633,465 B2
(45) Date of Patent: *Oct. 14, 2003

(54) MAGNETORESISTIVE ELEMENT

(75) Inventors: Hiroyuki Hoshiya, Hitachi (JP);
Katsuya Mitsuoka, Hitachi (JP);
Masaaki Sano, Hitachi (JP); Reiko Arai, Mito (JP); Susumu Soeya, Hitachiota (JP); Hiroshi Fukui, Hitachi (JP); Moriaki Fuyama, Hitachi (JP); Fumio Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/840,869

(22) Filed: Apr. 25, 2001

(65) Prior Publication Data

US 2001/0017752 A1 Aug. 30, 2001

Related U.S. Application Data

(63) Continuation of application No. 09/588,183, filed on Jun. 7, 2000, now Pat. No. 6,249,405, which is a continuation of application No. 09/366,595, filed on Aug. 3, 1999, now Pat. No. 6,125,019, which is a continuation of application No. 08/045,189, filed on Apr. 13, 1993, now Pat. No. 5,933,297.

(30) Foreign Application Priority Data

Apr. 13, 1992 (JP) .............................................. 4-092562
Feb. 5, 1993 (JP) .............................................. 5-018430

(51) Int. Cl.$^7$ ................................................ G11B 5/39
(52) U.S. Cl. .................................................. 360/324.1
(58) Field of Search .......................... 360/324.1, 125, 360/126, 314; 324/207.21, 252; 338/32 R

(56) References Cited

U.S. PATENT DOCUMENTS 4,103,315 A   7/1978   Hempstead et al. ........ 360/113
4,881,143 A   11/1989  Bhattacharyya et al. .... 360/113

(List continued on next page.)

FOREIGN PATENT DOCUMENTS

DE   4027226   8/1991
EP   0490608   6/1992

(List continued on next page.)

OTHER PUBLICATIONS

B. Dieny et al., "Giant magnetoresistance in soft ferromagnetic multilayers", *Physical Review B*, vol. 43, No. 1, Jan. 1, 1991, pp. 1297–1300.

B. Dieny et al., "Spin–valve effect in soft ferromagnetic sandwiches", *Journal of Magnetism and Magnetic Materials*, vol. 93, 1991, pp. 101–104.

(List continued on next page.)

*Primary Examiner*—George J. Letscher
(74) *Attorney, Agent, or Firm*—Antonelli, Terry, Stout & Kraus, LLP

(57) ABSTRACT

A magnetoresistive element includes a first antiferromagnetic film, a first magnetic film having a magnetization direction fixed by magnetic coupling with the first antiferromagnetic film, a second antiferromagnetic film, a second magnetic film having a magnetization direction fixed by magnetic coupling with the second antiferromagnetic film, a third magnetic film having a magnetization direction able to rotate in response to an applied magnetic field, a first nonmagnetic film disposed between the first magnetic film and the third magnetic film, and a second nonmagnetic film disposed between the second magnetic film and the third magnetic film. The third magnetic film is disposed between the first nonmagnetic film and the second nonmagnetic film, the first magnetic film is disposed between the first antiferromagnetic film and the first nonmagnetic film, and the second magnetic film is disposed between the second antiferromagnetic film and the second nonmagnetic film.

8 Claims, 13 Drawing Sheets

U.S. PATENT DOCUMENTS

| | | | |
|---|---|---|---|
| 4,903,158 A | 2/1990 | Smith | 360/113 |
| 4,949,039 A | 8/1990 | Grünberg | 324/252 |
| 5,021,909 A | 6/1991 | Shiiba | 360/113 |
| 5,089,334 A | 2/1992 | Mallary et al. | 360/113 |
| 5,097,372 A | 3/1992 | Fukazawa et al. | 360/126 |
| 5,159,513 A | 10/1992 | Dieny et al. | 360/113 |
| 5,168,409 A | 12/1992 | Koyama et al. | 360/113 |
| 5,206,590 A | 4/1993 | Dieny et al. | 360/113 |
| 5,218,497 A | 6/1993 | Tanabe et al. | 360/126 |
| 5,255,141 A | 10/1993 | Valstyn et al. | 360/126 |
| 5,258,884 A | 11/1993 | Howard et al. | 360/113 |
| 5,287,237 A | 2/1994 | Kitada et al. | 360/113 |
| 5,287,238 A | 2/1994 | Baumgart et al. | 360/113 |
| 5,726,838 A | 3/1998 | Soeya et al. | 360/113 |
| 5,933,297 A | 8/1999 | Hoshiya et al. | 360/113 |
| 6,125,019 A | 9/2000 | Hoshiya et al. | 360/324.1 |

FOREIGN PATENT DOCUMENTS

| | | |
|---|---|---|
| JP | 2-23681 | 1/1990 |
| JP | 2-61572 | 3/1990 |
| JP | 2-91807 | 3/1990 |
| JP | 4-211106 | 8/1992 |
| JP | 4-321913 | 11/1992 |
| JP | 5-46945 | 2/1993 |

OTHER PUBLICATIONS

*Patent Abstracts of Japan,* vol. 14, No. 296, P–1067, Jun. 26, 1990 (English abstract of Japanese patent reference 2–91807 published on Mar. 30, 1990).

T. Shinjo et al., "Large Magnetoresistance of Field–Induced Giant Ferrimagnetic Multilayers", *Journal of the Physical Society of Japan,* vol. 59, No. 9, Sep. 1990, pp. 3061–3064.

C. Tsang et al., "Gigabit Density Recording Using Dual–Element MR/Inductive Heads on Thin–Film Disks", *IEEE Transactions on Magnetics,* vol. 26, No. 5, Sep. 1990, pp. 1689–1693.

C. Bajorek et al., "Nonlinear Magnetoresistive Head", *IBM Technical Disclosure Bulletin,* vol. 16, No. 10, Mar. 1974, pp. 3485–3486.

E. Vélu et al., "Enhanced magnetoresistance of ultrathin $(Au/Co)_n$ multilayers with perpendicular anisotropy", *Physical Review B,* vol. 37, No. 1, Jan. 1, 1988, pp. 668–671.

M. Baibach et al., "Giant Magnetoresistance of (001)Fe/(001)Cr Magnetic Superlattices", *Physical Review Letters,* vol. 61, No. 21, Nov. 21, 1988, pp. 2472–2475.

FIG. I
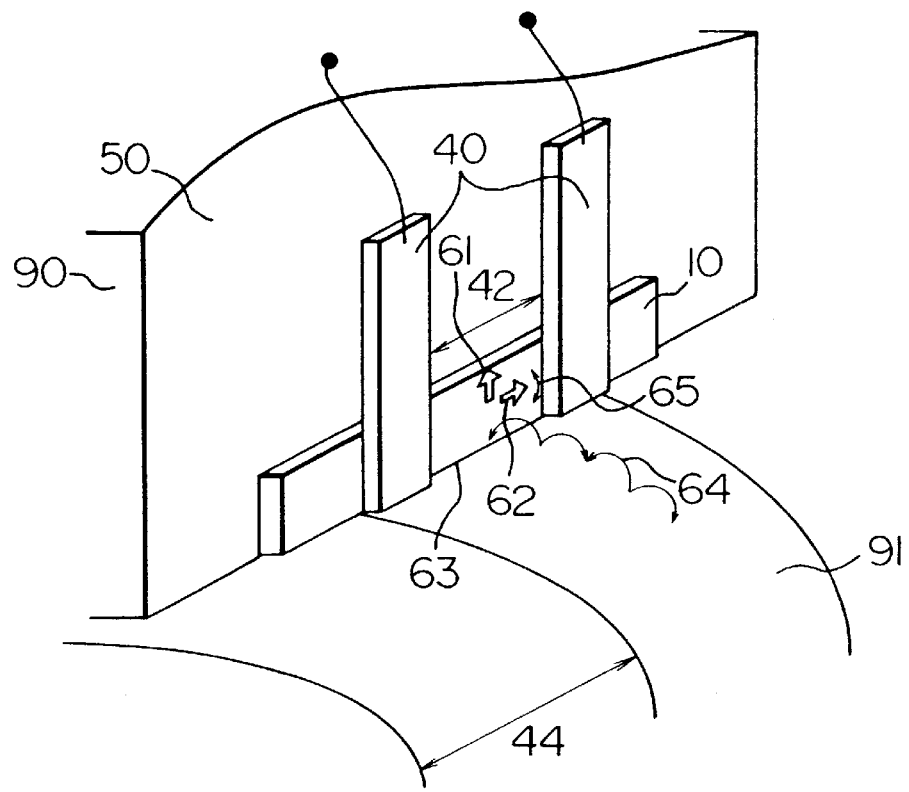
FIG. 2
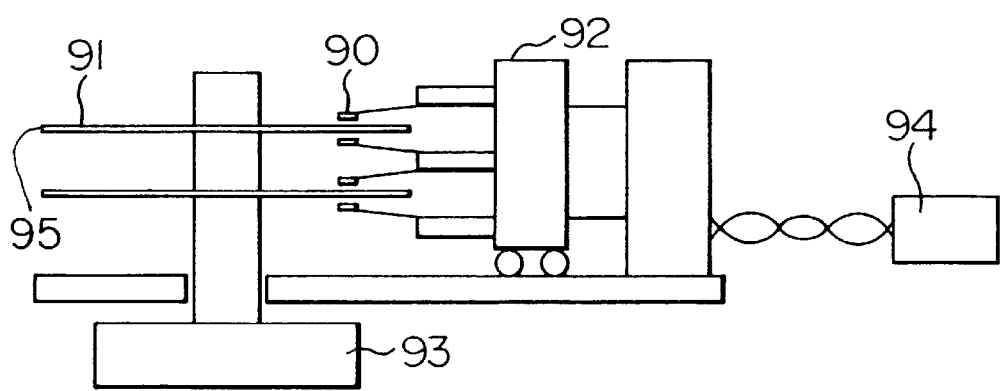

MAGNETORESISTIVE ELEMENT

CROSS-REFERENCES TO RELATED APPLICATIONS

This application is a continuation of application Ser. No. 09/588,183 filed on Jun. 7, 2000, now U.S. Pat. No. 6,249,405, which is a continuation of application Ser. No. 09/366,595 filed on Aug. 3, 1999, now U.S. Pat. No. 6,125,019, which is a continuation of application Ser. No. 08/045,189 filed on Apr. 13, 1993, now U.S. Pat. No. 5,933,297. The contents of application Ser. Nos. 09/588,183, 09/366,595, and 08/045,189 are incorporated herein by reference in their entirety.

BACKGROUND OF THE INVENTION

The present invention relates to magnetic storage/read systems and more particularly to a magnetic storage/read system having a high recording density.

A prior art magnetic storage/read system in which metallic magnetic and nonmagnetic films having different magnetic properties are stacked is disclosed in *Journal of the Physical Society of Japan*, Vol. 59, No. 9, September 1990, pp. 3061–3064.

Also disclosed in *Physical Review B*, Vol. 43, No. 1, Jan. 1, 1991, pp. 1297–1300, is another prior art magnetic storage/read system in which an FeMn antiferromagnetic film is laminated with a ferromagnetic film, a nonmagnetic film and a ferromagnetic film.

JP-A-2-61572 discloses a magnetic field sensor which uses a ferromagnetic thin film separated by an interlayer and an antiferromagnetic thin film adjacent to one side of the ferromagnetic thin film.

Further disclosed in JP-A-2-23681 is a multilayer film which comprises a ferromagnetic thin layer having magnetoresistive effects and a metallic conductive thin layer.

In the prior art techniques, it has been difficult to realize a magnetic storage/read system having a high recording density and particularly a function as a storage device comprising a magnetoresistive element which provides sufficient sensitivity and output in response to an applied field.

SUMMARY OF THE INVENTION

It is an object of the present invention to provide a magnetic storage/read system which has a high recording density.

In accordance with an aspect of the present invention, a magnetic storage/read system, which in use is connected to an external device such as a computer, comprises preferably a recording medium for magnetically storing a signal, an electric-magnetic transducer opposing the recording medium, means for rotating the recording medium relative to the electric-magnetic transducer, and means for moving the electric-magnetic transducer to a predetermined position relative to the recording medium. It is more desirable that the magnetic storage/read system further comprises an interface circuit through which the system is connected to an external data processor and a circuit for processing signals stored on the recording medium.

The recording medium used in the present invention refers to a so-called magnetic disk which has a magnetic film for magnetically storing signals thereon, a substrate and a protective layer. The signal to be recorded on the recording medium may be recorded longitudinally in or perpendicularly to the plane of the recording medium. The magnetic film of the recording medium is required to have a coercivity that can magnetically hold the signals thereon.

The electric-magnetic transducer used in the present invention refers to a so-called magnetic head which can record signals on the recording medium or reproduce signals recorded thereon. The magnetic head used in the present invention is a dual type head having separate write and read heads. In particular, the read head preferably comprises a magnetoresistive head which detects a leakage magnetic field from the recording medium and reproduces the detected field in the form of a change in an electric resistance.

The magnetoresistive head is also referred to as a magnetoresistive element. The magnetoresistive element used in the present invention preferably comprises a magnetoresistive film for detecting a leakage magnetic field from the recording medium, a domain control film for controlling a magnetic domain created in the magnetoresistive film, a shunt film for applying a magnetic field for prescribing the magnetic driving range of the magnetoresistive film in a specific direction, and a soft magnetic film. In this case, the shunt film refers to an electrically conductive film formed adjacent to the magnetoresistive film such as a tantalum film or a copper film, and acts to apply a magnetic field generated by a current flowing therethrough to the magnetoresistive film. Similarly, the soft magnetic film refers to a soft magnetic film separated from the magnetoresistive film by a nonmagnetic film, and acts to apply to the magnetoresistive film a bias field generated by static coupling at an edge of the magnetoresistive film. These films do not physically contribute to the magnetoresistive effect per se but merely control the magnetization direction of the magnetoresistive film.

In accordance with an aspect of a magnetic storage/read system of the present invention, a magnetoresistive element in the magnetic storage/read system is made of a substrate, an antiferromagnetic film, a magnetic film, a nonmagnetic conductive film, a soft magnetic film, a nonmagnetic conductive film, a magnetic film and an antiferromagnetic film which are sequentially layered on said substrate, and said magnetoresistive element is driven relative to said medium in the longitudinal direction of the recording medium.

The antiferromagnetic film is made preferably of nickel oxide, but may be made of iron-manganese alloy, chromium-manganese alloy or chromium-aluminum alloy, or may be made of a hard magnetic material such as cobalt-platinum alloy or iron-cobalt-terbium alloy. The hard magnetic film is assumed to have a property that it is difficult to change its magnetization with an applied field and to have a coercivity of, e.g., above 100 Oe. Then, even when 50 Oe of magnetic field is applied, the direction of the magnetization of the hard magnetic film will not be substantially changed. Therefore, the hard magnetic film has an effect similar to that of the antiferromagnetic film. That is, the hard magnetic film has a property that when it contacts another magnetic film, it can apply unidirectional anisotropy based on the exchange coupling bias effect. It is not necessary to use an antiferromagnetic film, and instead a film generally called a bias film may be used.

The ferromagnetic film is made preferably of an alloy of 70–95 atomic % of Ni, 5–30 atomic % of Fe and 1–5 atomic % of Co or made of an alloy of 30–85 atomic % of Co, 2–30 atomic % of Ni and 2–50 atomic % of Fe. The ferromagnetic film may be also made of Permalloy or Permendur alloy. In other words, any material that is ferromagnetic and has a good soft magnetic property can be preferably employed for the ferromagnetic film.

The nonmagnetic film is made preferably of any one selected from the group of Au, Ag and Cu. The film may be made of Cr, Pt, Pd, Ru, Rh or an alloy thereof. That is, any material that does not have a spontaneous magnetization property at room temperature and has a high electron transmission property is preferably used as the material of the nonmagnetic film. The film has a thickness of preferably about 2–1000 Å.

Further, in place of the nonmagnetic conductive film, a very thin nonmagnetic insulating film may be used. In other words, this film is only required to allow electron movement between the magnetic films, such that an electron tunneling effect through a nonmagnetic insulating film may be employed if necessary. In the latter case, it is necessary to make the nonmagnetic insulating film thin enough to enable the electron tunneling effect. The nonmagnetic insulating film is formed to have a thickness of generally below 100 Å and preferably below 50 Å. The nonmagnetic insulating film may be formed preferably as a surface oxide of the soft magnetic film or as an aluminum oxide layer on a metallic film such as an aluminum film additionally formed on the soft magnetic film. The nonmagnetic insulating film may be made of alumina as necessary. In other words, a film having a property of interrupting the magnetic coupling between the magnetic films is preferably used as the nonmagnetic insulating film.

The substrate is used as a base for formation of the above films and acts preferably as a slider for the magnetic disk. The material of the substrate is preferably a ceramic such as stabilized zirconia and alumina, or silicon.

The magnetoresistive element having such a film structure as mentioned above has a property that its electric resistance varies with a very weak magnetic field applied thereto and its resistance change ratio is as large as 4–10%. For this reason, the magnetic storage/read system of the present invention can have a function of directly digitizing a recorded analog signal in its reproduction or read mode and advantageously can have a high recording capacity per disk area, i.e., a high recording density.

Also, the film structure may comprise a flat alumina or nickel oxide film formed on the substrate or a film of iron, titanium, zirconium, hafnium, niobium or cobalt-iron alloy formed on the substrate as an underlayer.

That is, it is preferable that the film formed on the substrate has a function of making flat the multilayered film formed thereon and has a uniform and flat film structure on the substrate or base, and the metallic films have thicknesses of 20 to 200 Å and the nonmetallic films have thicknesses of about 5 to 1000 Å.

In accordance with another aspect of the present invention, there is provided another example of the magnetoresistive element used in the magnetic storage/read system, which element has a sandwich structure in which a nonmagnetic conductive film is disposed between magnetic films and in which an antiferromagnetic film directly contacts one of the magnetic films while a hard magnetic film directly contacts the other magnetic film.

The sandwich structure having the nonmagnetic conductive film disposed between the magnetic films means that the magnetoresistive element has a film structure which comprises at least a magnetic film, a nonmagnetic conductive film and a magnetic film sequentially stacked.

The magnetoresistive element used in the present invention, which has such a sandwich structure as mentioned above, has a function of causing electron spin dependent scattering in the interfaces between the magnetic films and the nonmagnetic film and also advantageously causing the magnetoresistive effect between the two magnetic films. The magnetoresistive element also has a function of interrupting the magnetic coupling between the magnetic films and advantageously improving its sensitivity to the magnetic field applied to the magnetoresistive element.

Further, since one of the magnetic films in the sandwich structure directly contacts the antiferromagnetic film and the other magnetic film directly contacts the hard magnetic film, the element has a function of applying anisotropies of different directions and strengths to the respective magnetic films and advantageously prescribing the magnetization direction and mobility of each magnetic film.

As a result, the magnetic storage/read system of the present invention advantageously can always provide a specific output to a varying signal, have good reproducibility and reduce an error rate in its reproduction mode.

In the formation of the film structure, the antiferromagnetic film may be formed on the substrate prior to the formation of the hard magnetic film, or the hard magnetic film may be formed on the substrate prior to the formation of the antiferromagnetic film.

That is, it is desirable that the element has a film structure made up of an antiferromagnetic film, a magnetic film, a nonmagnetic conductive film, a magnetic film and a hard magnetic film, and that the antiferromagnetic and hard magnetic films have thicknesses of about 20 to 2000 Å.

Furthermore, in the magnetoresistive element used in the present invention, it has been found that a bias film made of antiferromagnetic material is preferably formed directly contacting the magnetic film as a means for inducing anisotropy in a specific direction.

Preferably, this bias film is positioned closer to the substrate than the magnetic and nonmagnetic films, is made flat on its surface to enhance the flatness of the layered films and to provide an underlayer function, and the anisotropy causes the domain structure of the magnetic film to be changed to a single domain, thus suppressing noise generation.

For example, the film structure comprises first and second magnetic films stacked with a nonmagnetic conductive film disposed therebetween and a bias film formed directly contacting the first magnetic film.

In this way, when the magnetoresistive element comprises a layered structure exhibiting the magnetoresistive effect and at least one pair of electrodes electrically contacting the layered structure for measurement of its electric resistance, the element can function as a magnetic field sensor and can detect a signal on the recording medium at a high sensitivity.

It is particularly desirable to sequentially stack on a base a first bias film, a first magnetic film, a first nonmagnetic conductive film, a second magnetic film, a second nonmagnetic conductive film, a third magnetic film, a second bias film and electrodes. In this connection, the third magnetic film preferably has the same magnetic characteristics as the first magnetic film.

Control over the biasing direction of the bias films and the anisotropy direction of the magnetic films is carried out preferably by applying a suitable magnetic field during deposition of the layered structure of the element according to the deposition process. It is also desirable that the layered structure is subjected to an in-field heat treatment during or after the formation of the layered structure of the element.

With regard to the application of the magnetic field during the film formation, it is desirable to control the direction and intensity of the magnetic field according to the film formation process to thereby control the bias applying direction of the bias films and the uniaxial anisotropy of the second magnetic film.

Further, when it is desired to subject the layered structure to an in-field heat treatment during the film formation, it is preferable to control the anisotropy of the first and third magnetic films and the uniaxial anisotropy of the second magnetic film.

In the case of providing a hard magnetic film as one of the bias films, it is desirable to apply a magnetic field after fabrication of the element to thereby orient the magnetization of the hard magnetic film in a predetermined direction.

When the anisotropy is controlled by the above method, the performance of the element can stably be kept high.

The material of the bias films preferably has a high electric resistance and more specifically has a resistivity above $5 \times 10^{-4}$ ($\Omega \cdot cm$). This bias film material prevents reduction of the output of the element caused by a current leakage and also controls the flatness of the layered structure. When a nickel oxide (NiO) film which is substantially an insulator is used as the bias film material, the field sensitivity become as high as about 10 Oe. Therefore, there can be realized a layered structure which has a reliability as high as about 2–4 times that of the prior art.

The magnetoresistive element used in the magnetic storage/read system of the present invention has a layered structure comprising at least a magnetic film, a nonmagnetic film and a magnetic film, in which one of the magnetic films has a magnetization fixed in a direction substantially perpendicular to the recording medium in the film plane while the other magnetic film has a rotatable magnetization initially oriented in a direction parallel to the recording medium in the plane of the other magnetic film in the absence of an applied magnetic field.

The 'direction substantially perpendicular to the recording medium' means a state wherein the films of the magnetoresistive element are opposed perpendicularly to the recording medium and parallel to a direction normal to the plane of the recording medium. The phrase 'substantially perpendicular' refers to a range of from –10 to +10 degrees around the perpendicular direction and preferably a range of from about –5 to about +5 degrees. The 'direction parallel to the recording medium in the plane of the other magnetic film' refers to a direction that is parallel to the plane of the recording medium and lies in the plane of the other magnetic film. In other words, when no field is applied, the magnetization of the other magnetic film is oriented in the above parallel direction and rotates from this direction when a field is applied.

Magnetization is a physical quantity which means the magnitude of a spontaneous magnetic vector of a ferromagnetic material itself, and in the present invention, it has a function of responding to an applied field. The fixing of the magnetization direction of one of the magnetic films and enabling the magnetization of the other magnetic film to rotate correspond to means for changing the angle between the magnetizations of the magnetic films with respect to the applied field and provides a high-frequency response to the applied field which is regular and has no hysteresis. Since the element of the present invention has such a response, the element can detect a signal magnetically recorded on the recording medium and convert it into an electric signal. Thus, a magnetic storage/read system using the element of the invention can advantageously have a low error rate and a high recording density and can provide analog-to-digital conversion.

As an example of the method for fixing the magnetization of one magnetic film and enabling the magnetization of the other magnetic film to rotate, an antiferromagnetic film can be formed directly in contact with one of the magnetic films to apply anisotropy to the magnetic film in a predetermined direction based on exchange coupling.

In accordance with another aspect of the present invention, there is provided a magnetic storage/read system in which one of the magnetic films has means for applying a first magnetic anisotropy in a direction substantially perpendicular to a recording medium and the other magnetic film has means for applying a second magnetic anisotropy that is smaller in magnitude than the first magnetic anisotropy in a direction parallel to the medium in a plane of the other magnetic film. As means for applying the second magnetic anisotropy smaller in magnitude than the first magnetic anisotropy, there is a method of utilizing shape or uniaxial anisotropy of the other magnetic film, of disposing a suitable shunt or soft magnetic film adjacent to the other magnetic film, or of directly contacting the other magnetic film with another bias film.

In accordance with another aspect of the present invention, there is provided a magnetic storage/read system wherein one of the magnetic films has a first magnetic anisotropy directed in a direction substantially perpendicular to a recording medium and the other magnetic film has a second magnetic anisotropy that is smaller in magnitude than the first magnetic anisotropy and that is directed in a direction parallel to the recording medium in a plane of the other magnetic film.

In accordance with another aspect of the present invention, there is provided a magnetic storage/read system wherein an angle between magnetization directions of the magnetic films varies in response to a magnetic field from a recording medium, one of the magnetization directions is substantially fixed, and the other magnetization direction rotates in response to the magnetic field.

In accordance with another aspect of the present invention, there is provided a magnetic storage/read system wherein magnetic anisotropies applied to at least two magnetic films are different from each other in direction or magnitude.

In a magnetic storage/read system of the present invention, magnetic films each have shape anisotropy in a direction parallel to a recording medium in a plane of the magnetic films.

In accordance with another aspect of the present invention, there is provided a magnetic storage/read system which comprises a recording medium for magnetically storing thereon a signal with a predetermined track width and also comprises a magnetoresistive element having a sandwich structure in which a nonmagnetic conductive film is disposed between magnetic films and which has a pair of electrodes for applying a current to the structure for detecting a leakage magnetic field from the medium, wherein a height of the structure in a direction perpendicular to the medium is smaller than a length of the structure between the electrodes, and the length between the electrodes is smaller than a width of a track formed on the medium. Thus, this causes the shape anisotropy to effectively act on the reproduction part of the magnetoresistive element, whereby the output range of the magnetoresistive element can be compensated for and a tracking error in a reproduction mode wherein a signal from a desired track is mixed with a signal from an adjacent track can be prevented.

Further, in accordance with another aspect of the present invention, there is provided a magnetic storage/read system which comprises a magnetoresistive element for reading out a magnetic field from a magnetization pattern written on a recording medium with a predetermined track width, wherein a height d ($\mu$m) of the element in a direction perpendicular to the medium and a track density Tr (tracks/inch) on the medium satisfy a relationship of $d \leq (12.5 \times 10^3)/Tr$. This relationship was obtained by experimentally making a magnetic storage/read system based on the present invention and testing the system with respect to its write and read ability.

In particular, with the magnetic storage/read system having the aforementioned magnetoresistive element mounted therein as a reproduction or read part, by prescribing a height of the element perpendicular to a face of the element opposed to the recording medium, i.e., the so-called MR height d, a good reproduction characteristic can be obtained.

In accordance with another aspect of the present invention, there is provided a magnetic storage/read system which comprises a recording medium for magnetically storing a signal thereon, a write head for recording a signal on the medium, and a read head for reproducing the signal from the medium, wherein the read head comprises a magnetoresistive element having a sandwich structure in which a nonmagnetic conductive film is disposed between magnetic films.

In accordance with another aspect of the present invention, there is provided a magnetic storage/read system which comprises a recording medium for magnetically storing a signal thereon, a write head for recording a signal on the medium and a read head having a sandwich structure in which a nonmagnetic conductive film is disposed between magnetic films for reproducing the signal from the medium, wherein a width of a slider face of the read head opposed to the medium in a track width direction is smaller than 0.8 times a width of a face of the write head opposed to the medium in the track width direction. This value of 0.8 was found by experimentally making a magnetic storage/read system based on the present invention and testing it with respect to its reproduction ability.

In accordance with another aspect of the present invention, there is provided a magnetic storage/read system which comprises a recording medium for magnetically storing a signal thereon and a magnetoresistive element for detecting a leakage magnetic field from the medium, wherein the element has a resistance change ratio which changes by 4.0 to 8.5% in response to a change of ±10 Oe in the leakage magnetic field from the medium.

In accordance with another aspect of the present invention, there is provided a magnetic storage/read system which comprises a recording medium for magnetically storing a signal thereon and a magnetoresistive element having a sandwich structure in which a nonmagnetic conductive film is disposed between magnetic films for detecting a leakage magnetic field from the medium, and wherein the element has a resistance change ratio which changes by 5.0 to 9.5% in response to a change of ±8 Oe in the leakage magnetic field from the medium. These values were obtained by experimentally making a magnetic storage/read system based on the present invention and testing it with respect to its reproducing output, and were indispensable for attaining a high recording density with the present element.

In accordance with another aspect of the present invention, there is provided a magnetic storage/read system which comprises a recording medium for magnetically storing a signal thereon and a magnetoresistive element for detecting a leakage magnetic field from the medium, wherein the element has a sandwich structure in which a nonmagnetic conductive film is disposed between magnetic films, an angle between magnetization directions of the magnetic films varies with a leakage magnetic field from the medium, the magnetization direction of one of the magnetic films is substantially fixed, and the magnetization direction of the other magnetic film rotates.

In a magnetic storage/read system of the present invention, in addition to the above arrangement, anisotropy is applied to the other magnetic film in a direction perpendicular to the direction of the leakage magnetic field.

In accordance with another aspect of the present invention, there is provided a magnetic storage/read system which comprises a substrate, an inductive type write head for recording a signal, and a magnetoresistive read head for reproducing the signal, wherein the read head has a sandwich structure in which a nonmagnetic conductive film is disposed between magnetic films, and the write head is formed between the substrate and the read head.

A magnetic storage/read system of the present invention comprises a magnetoresistive element which includes a film structure wherein magnetic films and nonmagnetic conductive films are alternately stacked and also includes electrical terminals such as electrodes for applying a current to the film structure, wherein magnetization inducing anisotropy is applied to some of the magnetic films in a direction parallel to the direction of a magnetic field to be sensed. A magnetoresistive effect dependent on the orientation of the magnetization takes place in the interfaces between the magnetic films and the nonmagnetic conductive films such that the electric resistance of the element varies with the angle between the magnetizations of the magnetic films separated by the nonmagnetic conductive films and the magnetoresistive effect does not depend on the direction of a current flowing in the film plane.

In a magnetic storage/read system of the present invention, in addition to the above arrangement, anisotropy is applied to the remaining magnetic films in a direction perpendicular to the direction of the magnetic field to be sensed.

In the magnetic storage/read system of the present invention, since the recording density is increased, a recording area unit on the recording medium can be made correspondingly small, short or narrow. This is attained by making small the reproduction part of the magnetic recording unit.

In the present invention, this can be attained by suppressing a reduction in the sensitivity of the very small magnetoresistive element caused by the shape anisotropy of the magnetic films. That is, this can be attained by making the magnetic films thin, because the magnitude of the shape anisotropy of the magnetic film is substantially proportional to the thickness of the film. Meanwhile, for the purpose of preventing an output reduction caused by surface scattering, a total thickness of the magnetoresistive film element must be between about 100 and 300 Å. This is because, even when the thickness of the respective magnetic films separated by the nonmagnetic films, and in particular the thickness of a soft magnetic film located in the middle of the element, is set to be below 100 Å, especially below 10–20 Å, this results in no reduction of the output. This action results from the fact that the physical mechanism of the magnetoresistive effect is based on the interfaces between the magnetic films and the nonmagnetic films.

In accordance with another aspect of the present invention, there is provided a magnetic storage/read system which comprises a recording medium for magnetically storing a signal thereon and a magnetoresistive element for detecting a leakage magnetic field from the medium, wherein the element has a sandwich structure in which a nonmagnetic conductive film and magnetic films are laminated, and the magnetic films of the magnetoresistive element have a shape that is short in a direction perpendicular to a face of the element opposed to the recording medium.

In the magnetic storage/read system of the present invention, the magnetic films have a rectangular shape that is long in a direction parallel to the face of the element opposed to the recording medium and that has an aspect ratio of 2 or more, and the width w of the magnetic films in the above parallel direction and the height d of the magnetic films in the perpendicular direction satisfy a relationship of $d \leq w$.

That is, one example of means for inducing magnetization is to form the magnetic films of the magnetoresistive element into a rectangular shape which is long in the direction parallel to the face of the element opposed to the recording medium and to provide an aspect ratio of 2 or more to induce shape anisotropy of the magnetic films in this direction. For the purpose of further increasing the recording density of the magnetic recording unit, the height (the so-called MR height d) of the magnetic films in a direction perpendicular to a face of the magnetoresistive element opposed to the recording medium and a width w of the magnetic films in a direction perpendicular to the above direction should satisfy a relationship $d \leq w$. This is because substantial shape anisotropy is often influenced by the shape of the electrodes.

In the magnetic storage/read system of the present invention, when the magnetic films are formed into a rectangular shape which is short in the direction perpendicular to the face of the element opposed to the recording medium and which has an aspect ratio of 2 or more and the height d of the magnetic films in this direction is set to be below 5 $\mu$m, the magnetic storage/read system can effectively detect a magnetic field on the recording medium.

This is because the size or thickness of the magnetic films are prescribed in order to induce a suitable magnitude of shape anisotropy in the magnetic films of the magnetoresistive element serving as magnetization inducing means.

With the magnetic storage/read system to the present invention, a recording density can be increased to about 2–10 times that of the prior art, and in particular the reproducing performance of the magnetoresistive element of the reproduction part can be enhanced to about 1.5–20 times.

Technical features, which form the base of the present invention, will be explained in the following.

A first feature is that magnetic films in the magnetoresistive element are separated by a very thin nonmagnetic film.

More specifically, the magnetoresistive effect caused by a difference between magnetization directions of the separated magnetic films is utilized, the thickness of the magnetic films is made small due to their separation, whereby the generation of magnetic anisotropy based on the shape of the element as well as a reduction in the sensitivity of the element to the magnetic field can both be prevented. As a result, miniaturization of the magnetoresistive element can be realized without deterioration of its reproducing ability. Further, the nonmagnetic film is made to be sufficiently thin with respect to its resistivity so that electrons can travel between the magnetic films through the nonmagnetic film, whereby a spin-direction-dependent magnetoresistive effect can take place. In addition, the thickness and structure of the magnetic films are controlled to make zero the magnetic coupling between the magnetic films or make the coupling small when compared to a leakage magnetic field from the recording medium, whereby the sensitivity of the element can be made high.

A second feature is that the magnetization directions of the magnetic films separated by the nonmagnetic film are induced in a specific direction. That is, the magnetization of one of the films is induced strongly in a direction parallel to the incoming direction of the leakage magnetic field from the recording medium. This direction is parallel to a direction normal to the face of the magnetoresistive element opposed to the recording medium. As a result, the magnetization of one of the magnetic films in the magnetoresistive element can be fixed in the above direction, while the magnetization of the other magnetic film is allowed to rotate in response to the leakage magnetic field from the recording medium, which enables the output of the magnetoresistive element to be made stable.

A third feature is that the magnetization of the other magnetic film is induced weakly in a direction perpendicular to the incoming direction of the leakage medium field. The term 'induced weakly' means that the inducing of the magnetization of the other magnetic film is weaker than the fixing of the magnetization of the one magnetic film.

As a result, the rotation of the magnetization of the other magnetic film can advantageously be promoted and thus sensitivity at high frequency can be enhanced and noise can be suppressed. Further, since the output at zero field is prescribed, the magnetic storage/read system can respond to both of positive and negative magnetic fields.

In accordance with the present invention, there is provided a magnetic storage/read system which comprises a recording medium for magnetically storing a signal thereon and a magnetoresistive element for detecting a leakage magnetic field from the medium, wherein the magnetoresistive element outputs a signal which varies stepwise in response to a variation in the leakage magnetic field.

The term 'stepwise' means that the response characteristic of the magnetoresistive element to the leakage magnetic field is not triangular but rectangular, that is, the characteristic has a part which varies relatively steeply with the leakage magnetic field and a part which is constant, i.e. which does not vary with the leakage magnetic field.

In accordance with the present invention, there is provided a magnetic storage/read system which comprises a recording medium for magnetically storing a signal thereon and an electric-magnetic transducer for detecting a leakage magnetic field from the medium, wherein the electric-magnetic transducer directly outputs a digital signal indicative of the detected leakage magnetic field.

That is, the above response characteristic of the magnetoresistive element of the present invention is utilized to detect a signal on the recording medium and simultaneously to non-linearly convert the signal into a rectangular wave signal and to directly output it as a digital signal. As a result, digitalizing circuits in a subsequent signal processing system can be omitted and the reproducing and signal processing speed can be made high with less error.

In accordance with the present invention, there is provided a magnetic storage/read system which comprises a recording medium for magnetically storing a signal thereon and a magnetoresistive element for detecting a leakage magnetic field from the medium, wherein the element includes means for applying a bias field higher than the leakage magnetic field and outputs a signal which varies continuously and linearly in response to a variation in the leakage magnetic field.

This utilizes the fact that the response characteristic of the magnetoresistive element of the present invention has a sharp step to linearly convert a signal on the recording medium and output it as an analog signal. The above sharp step of the response characteristic can be controlled by controlling the magnitude of anisotropy applied to the magnetic films, and therefore it is necessary to provide means for applying anisotropy that is nearly equal to or larger than the leakage magnetic field from the recording medium.

Further, the thickness of the magnetic films of the magnetoresistive element used in the present invention is set to be preferably between 5 and 1000 Å and more preferably below 100 Å. This is to enable the magnetic films to have sufficient magnetization and to enable current in the magnetoresistive element to be fully effectively utilized in the magnetoresistive effect.

It is preferable that the nonmagnetic conductive film separating the magnetic films has a thickness of 5 to 1000 Å. The thickness of the nonmagnetic conductive film is set so that electron conduction cannot be prevented and especially so that the antiferromagnetic or ferromagnetic coupling between the magnetic films can be kept sufficiently small. Specifically, it is preferable that a thickness t of the nonmagnetic conductive film expressed in Å and an electric resistivity ρ of the nonmagnetic conductive film expressed in $\mu\Omega$·cm satisfy a relationship of t Å×ρ$\mu\Omega$·cm<100 Å·$\mu\Omega$·cm. When the nonmagnetic conductive film is made of Cu, for example, the film is made to have a thickness of desirably 10 to 30 Å. As is well known in the art, the electric resistivity ρ of Cu is approximately 1.7 $\mu\Omega$·cm. For a Cu film having a thickness t=30 Å, 30 Å (t)×1.7 $\mu\Omega$·cm (ρ)=51 Å·$\mu\Omega$·cm, which is less than 100 Å·$\mu\Omega$·cm. Thus, a Cu film having a thickness of 10 to 30 Å satisfies the relationship of t Å×ρ$\mu\Omega$·cm<100 Å·$\mu\Omega$·cm.

The magnetic films, which are preferably soft magnetic films, are made preferably of an alloy of 70–95 atomic % of Ni and 5–30 atomic % of Fe.

Further, the magnetic films are made preferably of the aforementioned Ni-Fe-series alloy with less than 5 atomic % of Co suitably added. Alternatively, the magnetic films are made desirably of an alloy thin film of a face centered cubic structure made of 30–85 atomic % of Co, 2–30 atomic % of Ni and 2–50 atomic % of Fe. In this case, a good layered structure can be formed, providing excellent soft magnetic characteristics and producing a large magnetoresistive effect.

The nonmagnetic conductive film is made preferably of at least one of Au, Ag and Cu. The nonmagnetic conductive film, when combined with the magnetic films, can produce a magnetoresistive effect, provide an excellent high conductivity and form part of a good layered structure.

In an example of an arrangement of the magnetoresistive element of the present invention, an NiO film, an NiFe film, a Cu film, an NiFe film, a Cu film, an NiFe film and an NiO film are sequentially stacked on a substrate to form a layered structure, and then a pair of electrodes are provided on the layered structure. Alternatively, an NiO film, a CoNiFe film, a Cu film, a CoNiFe film, a Cu film, a CoNiFe film and an NiO film are sequentially stacked on a substrate to form a layered structure, and then a pair of electrodes are provided on the layered structure.

As another example of an arrangement of the magnetoresistive element of the present invention, an NiO film, a CoNiFe film, a Cu film, an NiFe film, a Cu film, a CoNiFe film and an NiO film are sequentially stacked on a substrate to form a layered structure, and then a pair of electrodes are provided on the layered structure. With such an arrangement, reduction in the output caused by surface scattering can be highly effectively prevented and thus its effective output can be increased, and the thickness of the middle film can be made thin, whereby deterioration of the sensitivity of the element caused by the shape anisotropy of the magnetic films can be prevented without deterioration of the output.

In this way, in the magnetic storage/read system of the present invention, the magnetoresistive element can be used as a reproduction unit, whereby a high recording density can be realized, that is, the recording wavelength to be recorded on the recording medium can be made short. Further, recording can be realized with the narrow width of a recording track, a sufficiently high level of reproduced output can be obtained, and thus good recording can be attained.

With the magnetic storage/read system of the present invention, less noise and a high reproduced output can be realized and recording can be carried out with an especially high recording density. This is because the magnetoresistive element of the invention can exhibit a change in a resistance change ratio as large as 4–10% in response to a change in the leakage magnetic field as small as ±10 Oe or less.

More specifically, in the magnetoresistive element used in the magnetic storage/read system of the present invention, a first magnetic film whose magnetization is induced strongly in a direction perpendicular to a face of the element opposed to the recording medium and a second magnetic film whose magnetization is induced weakly in a direction perpendicular to the above perpendicular direction are positioned opposing each other with a nonmagnetic film disposed therebetween.

This magnetoresistive element is disposed close to the recording medium to detect a leakage magnetic field reaching from the recording medium to the element in the form of a change in the electric resistance of the multilayer film. That is, in response to the magnetic field, the magnetization of the second magnetic film is rotated while the magnetization of the first magnetic film remains substantially fixed. For this reason, the angle between the magnetizations of the first and second magnetic films can vary stably with a variation in the leakage magnetic field and an output signal can be obtained based on the magnetoresistive effect.

Electrons travel between the two magnetic films through the nonmagnetic film and the relative difference between the magnetization orientations of the magnetic films causes the scattering probability to vary depending on the electron spin orientation, whereby a large magnetoresistive effect takes place. This effect does not depend on the direction of a current flowing in the film and the entire magnetization orientation.

The multilayered film of the magnetoresistive element is formed to have a field sensing width as small as less than 5 $\mu$m and the height of the layered film is made to be about 1 $\mu$m, so that the element can effectively detect a leakage magnetic field from the recording medium with a good sensitivity and can perform its reproducing operation with an especially high recording density.

The magnetic anisotropy based on the shape of the magnetic film can be approximately expressed by the following equation.

$$Hk=2/\pi\times\{\tan^{-1}(tL/dr)-\tan^{-1}(td/Lr)\}\times Bs\times 10^4$$

In the above equation, Hk (in oersteds) denotes the intensity of a shape anisotropy field acting on a rectangular magnetic material having a thickness t, a height d and a length L and tending to point in the longitudinal direction of the rectangular magnetic material, Bs denotes the saturation flux density of the magnetic material (in teslas), and $r = \sqrt{(t^2+L^2+d^2)}$. If t<<L, d and d≦L/2 and Bs=1.0 using the value of Permalloy or Sendust as a typical magnetic material, then the shape anisotropy field becomes as follows.

$$Hk \sim 0.4t(Å)/d(\mu m)$$

When a unidirectional anisotropic field of the bias film is between 100 and 200 Oe in the present invention, it is desirable that the shape anisotropy field Hk is from 0.4 to 100 (exclusive) Oe, that is, larger than the coercivity of the soft magnetic material and smaller than the bias field. With the magnetoresistive element of the present invention, even when the thickness of the ferromagnetic film is made as thin as 10–50 Å, this does not cause reduction of the output. Accordingly, by the above equation, even in the case of a 1 μm-high magnetoresistive element, the shape anisotropy field is as small as 4–20 Oe and thus the sensitivity of the magnetoresistive element will not be deteriorated. In the operation of the present invention, further, the above shape anisotropy field causes the magnetization direction of the magnetoresistive element to be prescribed. This effect is strengthened as the width of the magnetoresistive element in the track width direction is decreased. That is, sensitivity reduction when the size of the magnetoresistive element is made small can be minimized and further the operation of the magnetoresistive element is rather compensated for.

As already explained above, there can be realized a small-sized magnetoresistive head which produces a large output with good reproducibility with respect to a small external magnetic field. In the present invention, further, even when the above reproduction or read head is mounted on a magnetic disk device, its recording density can be increased by prescribing the recording wavelength, recording width, etc. From the comparison with a magnetic head using a prior art magnetoresistive element, the effects of the present invention can be evaluated. When the present invention is compared with the prior art magnetoresistive element using a Permalloy film of 200 Å thick with use of the above equation for evaluation of the shape anisotropy field, the read head of the present invention can have a shape anisotropy field about 10 times smaller. Assuming that the characteristics of the recording medium and the head-disk spacing characteristic in the magnetic disk device are the same in the present invention and in the prior art, then the reproducible recording wavelength in the present invention is only ⅓ of that in the prior art. Meanwhile, the output in the present invention is about 3 times that in the prior art because it is proportional to the resistance change ratio. When this is converted to track width, the present invention can generate the same output as the prior art with a track width of only about ⅓ of that in the prior art. From the above consideration, it will be seen that the recording density of the magnetic storage/read system of the present invention can be increased to about 10 times that of the prior art. More concretely, there can be provided a magnetic storage/read system which has a recording wavelength of 0.1 to 0.3 μm, a track width of 0.2 to 4 μm or a surface recording density of 0.5 to 30 Gb/in².

BRIEF DESCRIPTION OF THE DRAWINGS

FIG. 1 schematically shows a magnetic storage/read system in accordance with the present invention;

FIG. 2 shows an arrangement of the magnetic storage/read system of the present invention;

DESCRIPTION OF THE PREFERRED EMBODIMENTS

Figure 3:
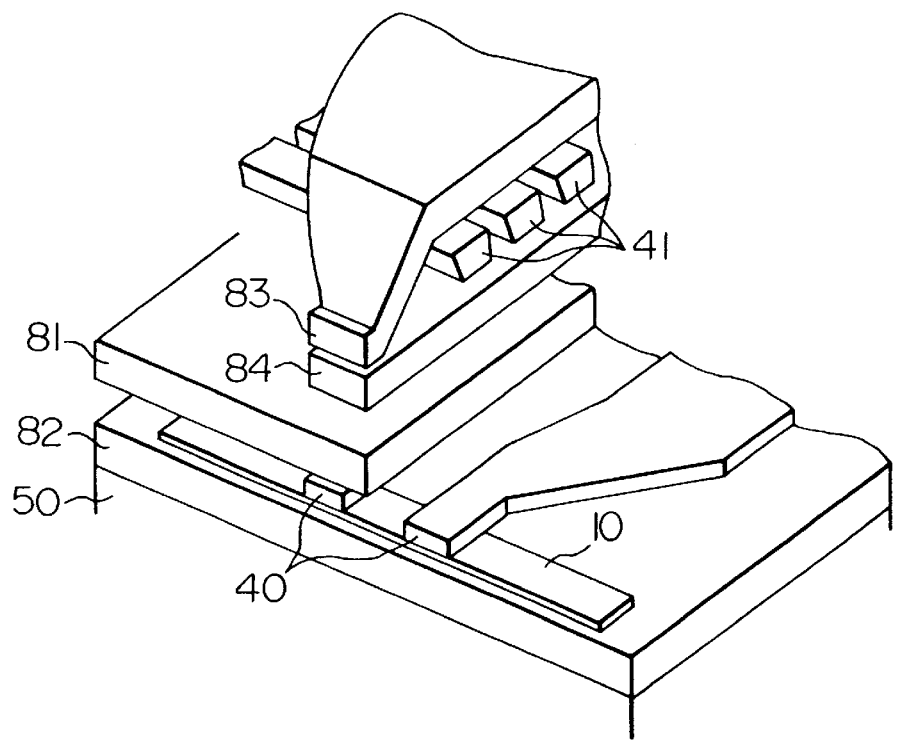
FIG. 3 schematically shows a thin-film magnetic head using a magnetoresistive element of the present invention.

An embodiment of the present invention will be detailed in conjunction with the accompanying drawings. Referring first to FIG. 1, there is schematically shown a magnetic storage/read system which uses a magnetoresistive element in accordance with the present invention. More specifically, a magnetoresistive film 10 and electrodes 40 are formed on a base 50 which is used also as a head slider 90. Such a head slider 90 is positioned on a recording medium 91 for reading out data therefrom. The recording medium 91 is rotated and the head slider 90 is moved relative to the recording medium 91 while opposed thereto and spaced by a height of less than 0.2 μm from the upper surface of the medium or in contact therewith. This mechanism allows the magnetoresistive film 10 to sit at such a position that a magnetic signal recorded on the recording medium 91 can be read out based on a leakage magnetic field therefrom. The magnetoresistive film 10 comprises a plurality of magnetic layers and nonmagnetic conductive layers alternately stacked, and a bias layer, in particular, an antiferromagnetic bias layer. One feature of the present invention is that a strong anisotropy in a direction perpendicular to a face 63 of the film 10 opposing the recording medium as shown by an arrow 61 is induced in some of the stacked magnetic layers, and desirably in alternate ones of the stacked magnetic layers, and the magnetization of these magnetic layers is substantially fixed in that direction. The other layers of the stacked magnetic layers act to apply a relatively weak anisotropy in a direction perpendicular to the arrow 61 in the plane of the magnetoresistive film, i.e., in a direction shown by an arrow 62, to induce magnetization in that direction. With such a structure, a signal magnetically recorded on the recording medium reaches the magnetoresistive film 10 as a leakage field 64 from the medium, the magnetization is rotated starting from the arrow 62 direction in directions shown by arrows 65 according to the leakage field, especially, according to a component of the leakage field in the plane of the magnetoresistive film, so that an angle between magnetization directions of two adjacent magnetic layers sandwiching a nonmagnetic conductive layer is varied, whereby a magnetoresistive effect takes place and a read output is obtained. The signal of the magnetoresistive element is obtained from that part of the magnetoresistive film 10 through which a current flows, that is, from the part of the film 10 between the electrodes 40 in FIG. 1. This part has a width 42 which is parallel to the surface of the recording medium 91 and which is smaller than a width 44 of a recording track. In particular, when the ratio of the width 42 to the track width 44 is less than 0.8, mixing of signals from adjacent tracks caused by a shift in the mutual positions of the adjacent tracks can be prevented.

FIG. 2 shows an arrangement of a magnetic storage/read system in accordance with the present invention. More specifically, a recording medium disk 95 having a recording medium 91 on both sides is rotated by a spindle motor 93 and an actuator 92 causes a head slider 90 to be guided onto a track of the recording medium 91. In this connection, the recording medium disk 95 is not always required to have magnetic films on both sides. When a magnetic film is provided only on one side of the disk, the head slider 90 is positioned only on one side of the recording medium disk.

In a magnetic disk device having such a mechanism as mentioned above, read and write heads formed on the head slider 90 are moved to a predetermined recording position on the rotating recording medium 91 to sequentially write signals thereon or sequentially read signals therefrom. A recording signal is recorded on the medium on the write head through a signal processor 94. When it is desired to move the read head to a desired recording track, the high-sensitivity output of the present read head can be used to detect the desired track position, control the actuator and then position the head slider.

Such a magnetic disk device is disclosed in U.S. application Ser. No. 07/947,261 filed on Sep. 18, 1992, now abandoned, and this application is incorporated herein by reference. U.S. application Ser. No. 07/947,261 is the parent application of U.S. continuation application Ser. No. 08/400,457 filed on Mar. 7, 1995, now U.S. Pat. No. 5,726,838.

Shown in FIG. 3 is a schematic diagram of a write/read separation type or a dual type head which comprises a write head in addition to a read head using the above element. More specifically, the dual type head comprises a read head using the element of the present invention, an inductive write head, and shield parts for prevention of mixing of read head signals caused by a leakage field. Although the magnetoresistive element of the invention has been combined with a write head for longitudinal recording in the present embodiment, the element may be combined with a write head for perpendicular recording. The read head of the dual type head comprises a lower shield film 82 formed on the base 50, the magnetoresistive film 10, the electrodes 40 and an upper shield film 81; while the write head of the dual type head comprises a lower magnetic film 84, a coil 41 and an upper magnetic film 83. The resultant dual type head can write a signal on the recording medium and read out a signal from the recording medium. When the sensing part of the read head and the magnetic gap of the write head are provided on the same slider at overlapping positions, simultaneous positioning to the same track can be realized. This dual type head is processed into a slider and the slider is installed in a magnetic storage/read system.

Figure 4:
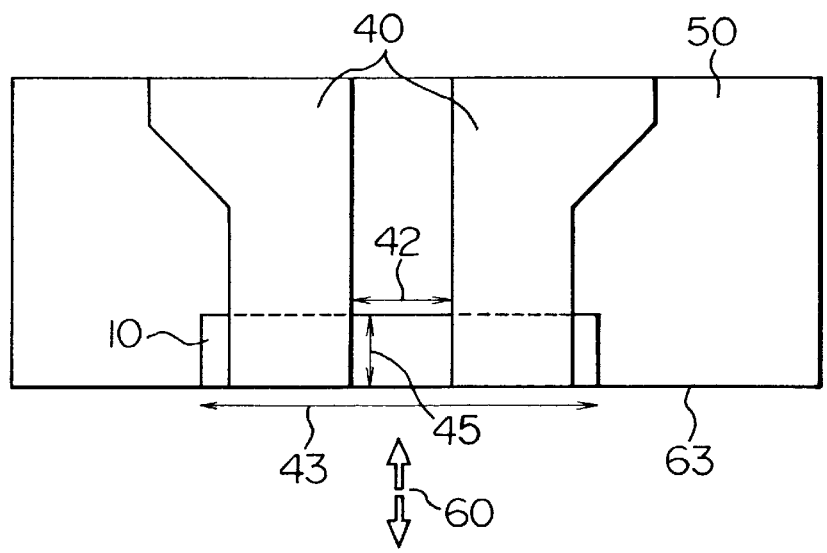
FIG. 4 schematically shows a structure of the magnetoresistive element of the present invention formed on a base.

FIG. 4 schematically shows an arrangement of the magnetoresistive element of the present invention on the base. The magnetoresistive film 10 is formed on the base 50 into a long rectangular or strip shape having an element width 43 along the face 63 opposing the recording medium. The formation of the film 10 into such a long strip has an effect that a suitable shape anisotropy can be applied in a direction perpendicular to a direction 60 in which a magnetic field to be sensed is applied to the magnetoresistive film 10. A current flows through the magnetoresistive film 10 and also through the electrodes 40 electrically contacting the film, so that a change in the resistance of the film 10 caused by the magnetic field applied to a field sensing part of the film 10 having the width 42 parallel to the plane of the recording medium 91 and a width 45 perpendicular thereto can be obtained as an output.

In the present schematic example, the magnetoresistive element is exposed at one end to the opposing face of the recording medium. However, when the magnetoresistive element is disposed inside the head and a yoke of soft magnetic material is provided in the head to guide the leakage field from the face of the head opposing the recording medium to the element inside, the mechanical durability of the element can be improved. In particular, when the MR height of the element is set to be small, the reluctance of the yoke can be decreased and thus the sensitivity of the head can be improved.

Figure 5:
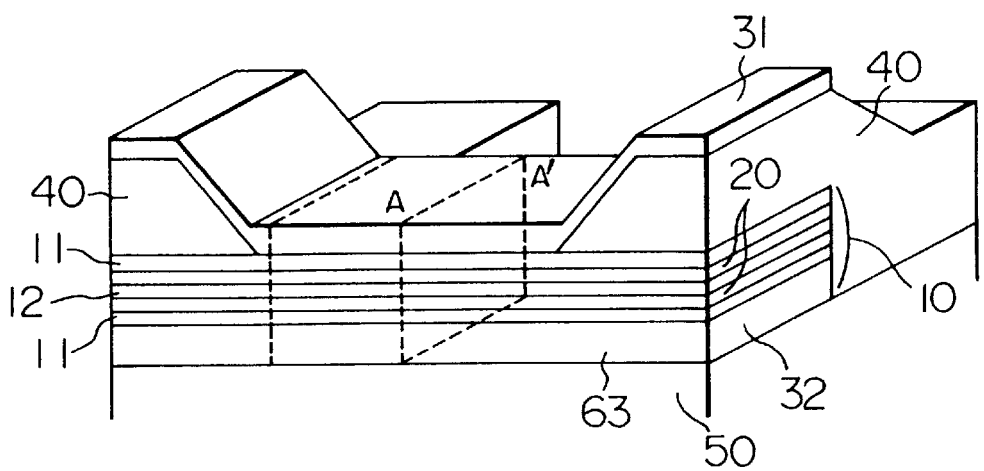
FIG. 5 shows an exemplary structure of a high-sensitivity magnetoresistive element in accordance with the present invention.

The magnetoresistive element of the present invention may have such a structure as shown, for example, in FIG. 5. Films stacked on the base 50 form the magnetoresistive film 10. More specifically, a bias film 32, a magnetic film 11, a nonmagnetic conductive film 20, a magnetic film 12, another nonmagnetic conductive film 20, another magnetic film 11, and a bias film 31 are sequentially formed on the base 50, and further the electrodes 40 are electrically connected to the magnetoresistive film 10. In the element structure of FIG. 5, the electrodes 40 are disposed under the bias film 31, which structure is effective, e.g., when the upper bias film is made of an insulator such as nickel oxide.

The electrodes may have another structure. For example, the bias film can be partly formed, and the electrodes 40 can be formed thereon. Alternatively, a conductive bias film such as an FeMn film or a CoPt film can be formed directly in contact with the electrodes.

A feature of the present invention is that each magnetic film 11 has a strong anisotropy applied by the bias films 31, 32, and the magnetic film 12 has a relatively weak anisotropy applied by a uniaxial anisotropy, a shape anisotropy, shunt film bias or soft magnetic film bias, and these films are alternately stacked with the nonmagnetic conductive films 20 disposed therebetween so that current can flow through the magnetic films without causing magnetic coupling between the magnetic films. The following explanation concentrates on the anisotropy application direction.

Figure 6:
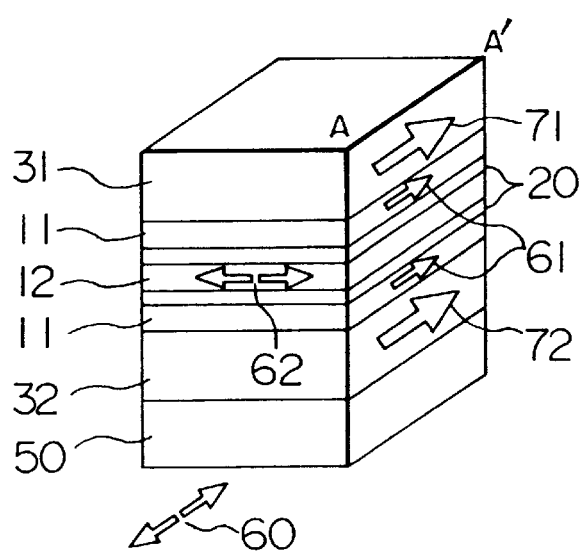
FIG. 6 is a diagram for explaining an example of anisotropy control of magnetic films in a magnetoresistive element of a multilayer type in accordance with the present invention.

FIG. 6 is a schematic diagram for explaining an example of anisotropy control in the magnetoresistive element of the present invention, and corresponds to a perspective view of the element of FIG. 5 cut off by dashed lines A–A'. In the drawing, an arrow 60 denotes the direction of a magnetic field to be sensed and an arrow 61 denotes the direction of unidirectional anisotropy induced in each magnetic film 11. The easy magnetization direction of the magnetic film 12 sandwiched between the nonmagnetic conductive films 20 is established by induction of uniaxial anisotropy in the direction of arrow 62. This is attained by applying a magnetic field in a predetermined direction during growth of the magnetic films. In the illustrated example, the anisotropy application is realized by means of the bias films 31, 32 and induced anisotropy. As a result, the arrows 61 and 62 are in the planes of the respective films and are perpendicular to each other. When the anisotropy of each magnetic film 11 is made large and the anisotropy of the magnetic film 12 is made small when compared with the magnitude of a magnetic field to be sensed, the magnetization of the magnetic film 11 is substantially fixed with respect to the applied field and only the magnetization of the magnetic film 12 responds largely to the applied field. Further, with respect to the magnetic field to be sensed applied in the direction of arrow 60, the anisotropy 61 causes the magnetization of the magnetic films 11 to be put in their easy axis magnetizing state parallel to the applied magnetic field to be sensed, whereas the anisotropy 62 causes the magnetization of the magnetic film 12 to be put in its hard axis magnetizing state perpendicular to the applied magnetic field to be sensed. Due to this effect, the above response can be enhanced and the magnetization of the magnetic film 12 rotates in response to the applied magnetic field to be sensed in the direction of arrow 62 in such a manner that a rotary hard axis magnetizing state causes the element to be driven, whereby noise caused by a magnetizing state based on displacement of a domain wall can be prevented and high frequency operation can be realized.

Figure 7:
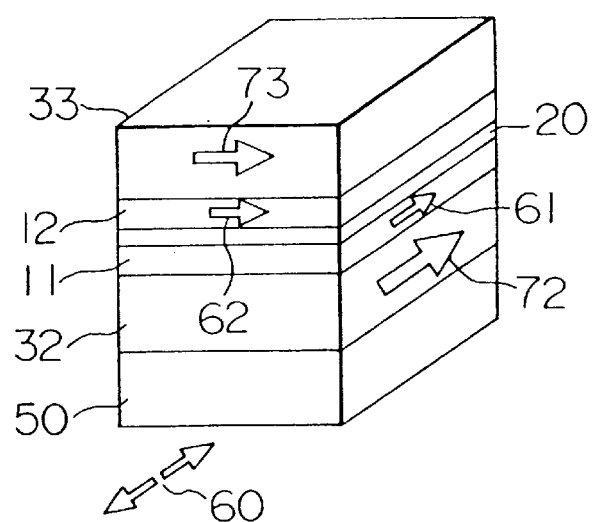
FIG. 7 is a diagram for explaining another example of anisotropy control of a magnetoresistive element of the present invention using a hard magnetic film and an antiferromagnetic film.

Shown in FIG. 7 is a schematic diagram showing a magnetoresistive element in accordance with another embodiment of the present invention, in which anisotropy application is realized, as an example, by means of two different types of bias films, i.e., an antiferromagnetic film and a hard magnetic film. More specifically, an antiferromagnetic film 32, a magnetic film 11, a nonmagnetic film 20, a magnetic film 12 and a hard magnetic film 33 are sequentially stacked on a base 50, and then electrodes (not shown) are connected to the resultant layered structure. The antiferromagnetic film 32 and hard magnetic film 33 are in tight contact with respective ones of the two magnetic films 11 and 12 separated by the nonmagnetic film, and then are subjected to an in-field heat treatment or a magnetizing process in directions 72 and 73 parallel and perpendicular to the direction 60 of a magnetic field to be sensed, so that the magnetization of the magnetic films 11 and 12 is induced in directions shown by arrows 61 and 62, respectively. The antiferromagnetic film is made of, e.g., nickel oxide, while the hard magnetic film is made of, e.g., a cobalt/platinum alloy. Even when the positions of the hard magnetic and antiferromagnetic films are reversed or their magnetization inducing directions are reversed, substantially the same effects can be obtained.

The constituent films of the magnetoresistive element of the present invention were prepared in the following manner with the use of an RF magnetron sputtering apparatus. First, a ceramic substrate and a single-crystal Si substrate having a thickness of 1 millimeter and a diameter of 3 inches were subjected to a sputtering process in an atmosphere having 3 millitorr of argon to deposit the following materials sequentially. Sputtering targets were made of nickel oxide, cobalt, nickel/20-atomic % iron alloy, and copper. For the addition of cobalt into the nickel/iron alloy, cobalt chips were disposed on the nickel/20-atomic % iron alloy target. For the addition of nickel and iron into the cobalt, nickel and iron chips were disposed on the cobalt target. The layered films were sequentially formed by applying RF power to respective cathodes provided with the respective targets to generate a plasma atmosphere in a furnace, and then by opening and closing shutters positioned for the respective cathodes sequentially one by one to thereby form the respective layers sequentially. At the time of forming the films, two pairs of electromagnets positioned perpendicular to each other in the plane of the substrate were used to apply some 50 oersteds of magnetic field parallel to the substrate to provide uniaxial anisotropy and also to induce the exchange coupling biasing directions of the nickel oxide films in the field directions.

The anisotropy induction was carried out by applying a magnetic field in an induction direction during the formation of each magnetic film with two pairs of electromagnets mounted in the vicinity of the substrate. Alternatively, the anisotropy induction was carried out by subjecting the multilayered film to an in-field heat treatment in the vicinity of the Neel temperature of the antiferromagnetic film after the formation of the multilayered film to induce its ferromagnetic biasing direction in the field direction.

The resultant layered structure was subjected to a patterning process and then to an electrode formation process to form a magnetoresistive element. The performance of the magnetoresistive element was evaluated. In this case, the direction of the uniaxial anisotropy of the magnetic film was set to be parallel to the direction of current in the element. A constant current was passed through the electrode terminals to apply a magnetic field in the plane of the element and in a direction perpendicular to the element current direction. The resistance of the element was measured in the form of a resistance change ratio based on a measured voltage between the electrode terminals.

Figure 8:
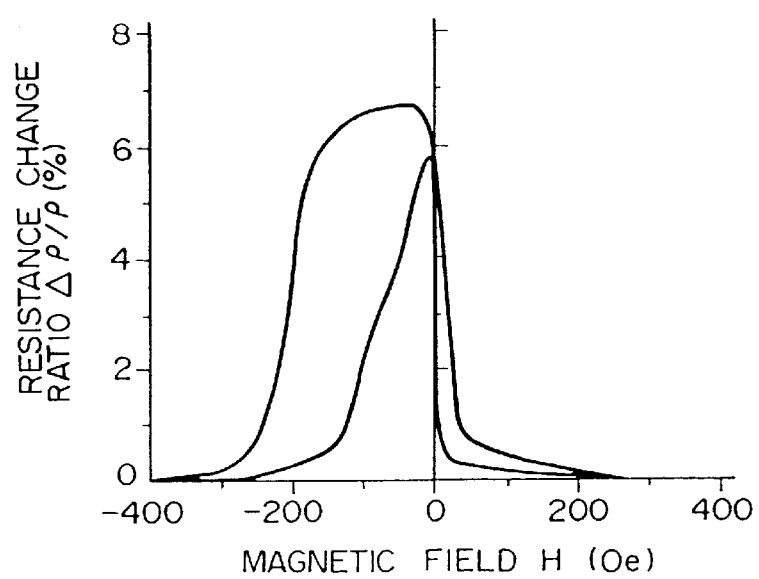
FIG. 8 shows a relationship between a magnetic field and a resistance change ratio in an NiO/NiFe/Cu/NiFe/Cu/NiFe/NiO film structure.
Figure 9:
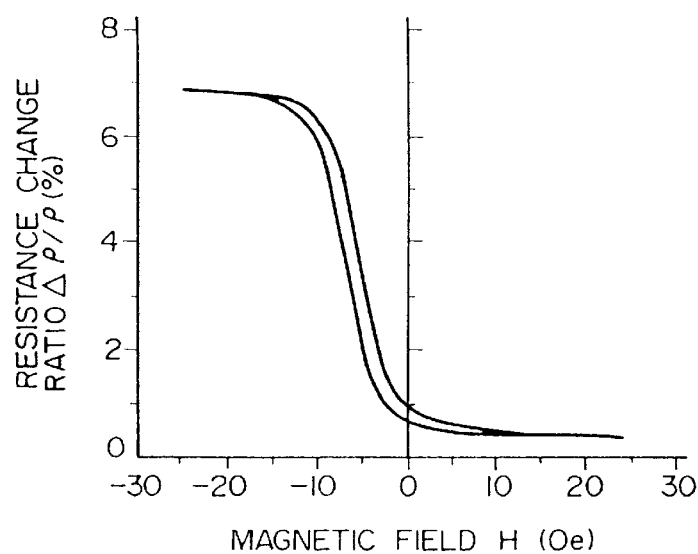
FIG. 9 shows a relationship between the magnetic field and the resistance change ratio in the NiO/NiFe/Cu/NiFe/Cu/NiFe/NiO film structure with respect to low magnetic fields.

FIG. 8 shows a resistance change ratio of an element having a layered structure as shown by Sample No. 1 in Table 1 with NiO films as its upper and lower layers with respect to an applied magnetic field. This layered structure corresponds to FIG. 6 but the bias films 31 and 32 are made of NiO, the magnetic thin films 11 and 12 are made of $Ni_{80}Fe_{20}$ alloy and the nonmagnetic conductive film is made of Cu. Prior to performing the field control, the uniaxial anisotropy is not applied in the direction of arrow 62 as shown in FIG. 6. FIG. 9 shows a resistance change ratio of the same element as in FIG. 8 with respect to a low applied magnetic field. In FIG. 9, this element, which was not subjected to the field control and heat treatment during the film formation, shows a change in the resistance change ratio of 7%. The rectangle-shaped curve in FIG. 8 fully shows the feature of the magnetoresistive element of the present invention. In other words, the effects of the magnetic films strongly induced in the field direction are detected as a loop corresponding to the left half of the curve. The other effects of the magnetic films not strongly induced appear as an abrupt change in the resistance change ratio in the vicinity of the center of the curve. For this reason, the element has a good response to the low magnetic field. In FIG. 9, the element exhibits a change in the resistance change ratio of 6.5% for a change in the magnetic field of −10 to 0 Oe. Since the magnitude of the reproduction output of the magnetoresistive element of the present invention corresponds to the magnitude of the change in the resistance change ratio while the sensitivity of the element becomes higher as the magnitude of the saturation field is smaller, it will be seen that the element of the invention has a large output and a high sensitivity. When strong antiferromagnetic coupling is present between the magnetic films, the curve of FIG. 8 has a triangle shape, thus reducing the field sensitivity of the element.

Even when the nonmagnetic conductive film was made of Cu with Ag and Au added and the multilayered film was made of Ag and Au, substantially the same effects could be obtained.

Figure 10:
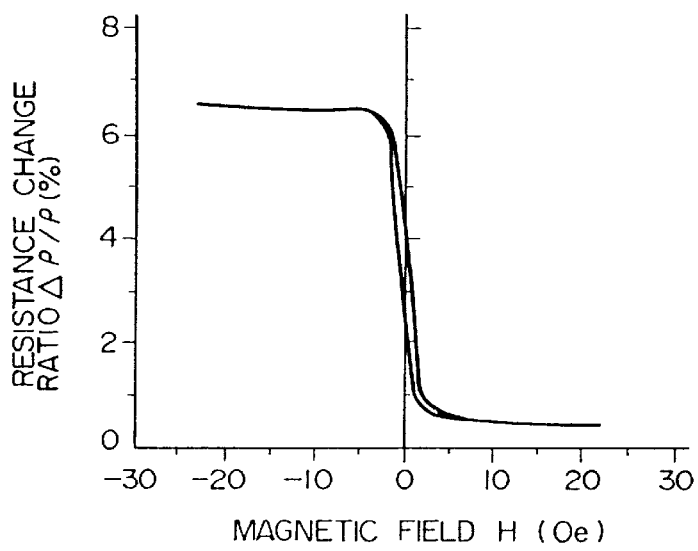
FIG. 10 shows a relationship between the magnetic field and the resistance change ratio in the NiO/NiFe/Cu/NiFe/Cu/NiFe/NiO film structure after it is subjected to an in-field heat treatment with respect to low magnetic fields.

In the magnetoresistive curve of FIG. 9, since the element was not subjected to a processing that causes the anisotropies of the respective magnetic films to be perpendicular to each other, the position of the center of the change in the resistance change ratio is shifted by −5 Oe from zero magnetic field. Shown in FIG. 10 is a resistance change ratio of an element for a low magnetic field after the above sample was subjected to a heat treatment in a vacuum atmosphere at 250° C. for one minute to cause the anisotropies of the magnetic films to be perpendicular to each other. During the heat treatment, 100 Oe of magnetic field was applied in the plane of the substrate to be perpendicular to the application direction during the film formation. The in-field heat treatment caused the bias anisotropy direction to be perpendicular to the direction of the uniaxial anisotropy of the magnetic films, which resulted in the element having an output to a magnetic field in a range of ±3 Oe symmetrically around zero magnetic field. This effect was obtained as a result of controlling the uniaxial anisotropy of the magnetic film 12 of FIG. 6 in the direction of arrow 62. Even when a magnetic field was controlled during the film formation to control the anisotropy, substantially the same effects were obtained.

Figure 11:
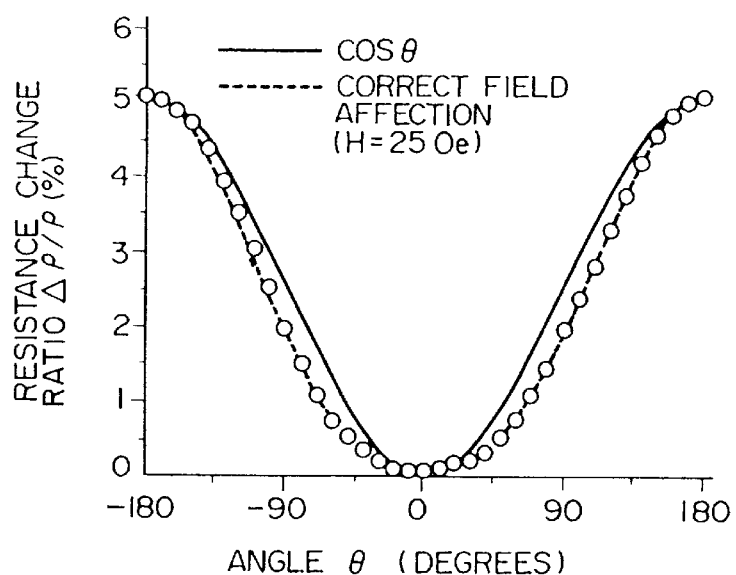
FIG. 11 shows the resistance change ratio of an NiO/NiFe/Cu/NiFe film structure in a rotating magnetic field.

FIG. 11 shows results when a sample shown by No. 5 in Table 1 was subjected to an in-field heat treatment to obtain perpendicular orientation of the magnetizations and the resistance change ratio of the resultant element was measured in a rotating field of 25 Oe. The resistance change ratio becomes minimum when the angle θ is zero, i.e., when the magnetizing direction is the same as the induction direction, and becomes maximum when the angle is 180 degrees. The resistance change ratio has a midpoint value between its maximum and minimum when the angle becomes about 90 degrees. And only when the magnetization direction of the magnetic film is set in this way can the resultant magnetoresistive element have its favorable properties, that is, the resistance change ratio of the element at zero magnetic field becomes nearly a midpoint value between the maximum and minimum and the element can have an output for both of positive and negative fields. When similar measurements were carried out on the element with an extremely large magnetic field such as 10 kOe, the read head of the present invention had substantially zero output during rotation. This can be obtained because the present invention utilizes the magnetoresistive effects of the multilayered film which are different from the operation of an ordinary prior art magnetoresistive element wherein the resistance change ratio varies with the current and the magnetization angle. In this way, the magnetoresistive mechanism and the direction and intensity of the magnetization induction can be found by measuring its resistance change ratio for various fields and angles.

Figure 12:
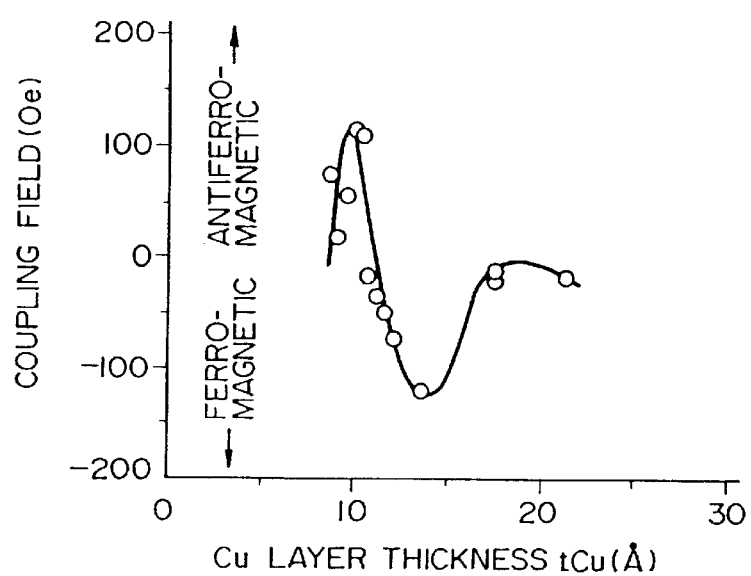
FIG. 12 shows a relationship between the thickness of a Cu layer and the intensity of coupling between magnetic films in the NiO/NiFe/Cu/NiFe film structure.

FIG. 12 shows results when NiO/NiFe/Cu/NiFe films having Cu layers of different thicknesses were subjected to measurements of their magnetization curves and the intensity of the magnetic coupling between the NiFe layers was determined. The intensity of the magnetic coupling oscillates between antiferromagnetic and ferromagnetic at a period of about 10 Å with respect to the varying thickness of the Cu layer. In order to obtain a magnetoresistive element having a high sensitivity to a magnetic field, it is essential to make the magnetic coupling substantially zero. When the nonmagnetic conductive film is made of Cu and the thickness of the conductive film is set to be about 11 Å or within a range of from 17 to 22 Å, the magnetic coupling between the magnetic films can be made zero. As a result, in response to an external magnetic field as weak as several Oe, the resistance of the element can vary greatly, that is, there can be obtained a magnetoresistive element having a high sensitivity.

Figure 13:
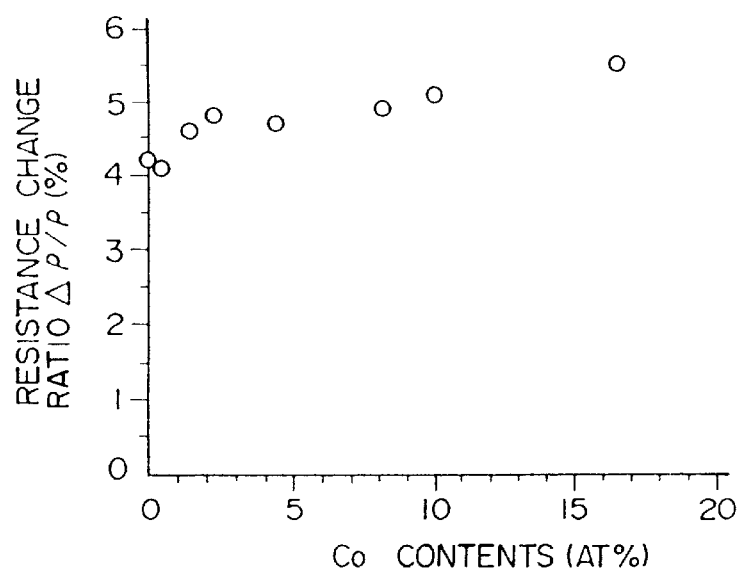
FIG. 13 shows the resistance change ratio when Co is added to an NiFe film.

FIG. 13 shows a relationship between an amount of Co added to the NiFe magnetic film and the resistance change ratio. The constitution of a multilayered film of the film is substantially the same as that when the sample No. 5 in Table 1 is used. It will be seen from the figure that, as the amount of Co increases, the resistance change ratio is increased from 4% for the NiFe alone to 5.5%. This means that the addition of Co to the NiFe enables improvement of the magnetoresistive effects of the film structure.

Table 1 shows exemplary properties of magnetoresistive elements fabricated with different layer constitutions.

TABLE 1

| Sample | Layer Material and Thickness (Å) | | Change in Resistance Change Ratio (%) | Saturation Field (Oe) | Evaluation |
| --- | --- | --- | --- | --- | --- |
| 1 | NiO | 300 | 6.5 | 12 | ◎ |
|  | NiFe | 60 |  |  |  |
|  | Cu | 21 |  |  |  |
|  | NiFe | 40 |  |  |  |
|  | Cu | 21 |  |  |  |
|  | NiFe | 60 |  |  |  |
|  | NiO | 300 |  |  |  |

TABLE 1-continued

| Sample | Layer Material and Thickness (Å) | | Change in Resistance Change Ratio (%) | Saturation Field (Oe) | Evaluation |
|---|---|---|---|---|---|
| 2 | NiO | 300 | 7.2 | 13 | ◎ |
|  | Co | 50 |  |  |  |
|  | Cu | 21 |  |  |  |
|  | NiFe | 40 |  |  |  |
|  | Cu | 21 |  |  |  |
|  | Co | 50 |  |  |  |
|  | NiO | 300 |  |  |  |
| 3 | NiO | 300 | 5.5 | 11 | ◎ |
|  | NiFe | 60 |  |  |  |
|  | Cu | 21 |  |  |  |
|  | NiFe | 40 |  |  |  |
|  | Cu | 21 |  |  |  |
|  | NiFe | 40 |  |  |  |
|  | Cu | 21 |  |  |  |
|  | NiFe | 60 |  |  |  |
|  | NiO | 300 |  |  |  |
| 4 | NiO | 300 | 7.5 | 16 | ◎ |
|  | Co | 60 |  |  |  |
|  | Cu | 21 |  |  |  |
|  | Co | 15 |  |  |  |
|  | NiFe | 40 |  |  |  |
|  | Co | 15 |  |  |  |
|  | Cu | 21 |  |  |  |
|  | Co | 60 |  |  |  |
|  | NiO | 300 |  |  |  |
| 5 | NiO | 300 | 4.5 | 15 | ○ |
|  | NiFe | 60 |  |  |  |
|  | Cu | 21 |  |  |  |
|  | NiFe | 40 |  |  |  |
| 6 | NiFe | 60 | 3.0 | 14 | △ |
|  | Cu | 21 |  |  |  |
|  | NiFe | 40 |  |  |  |
|  | NiO | 300 |  |  |  |
| 7 | NiFe | 60 | 3.9 | 10 | △ |
|  | Cu | 21 |  |  |  |
|  | NiFe | 40 |  |  |  |
|  | FeMn | 150 |  |  |  |

In Table 1, element properties were expressed in terms of a change in resistance change ratio and a saturation field. The reproduced or read output of the element is increased as the magnitude of the change in the resistance change ratio increases while the sensitivity is increased as the saturation field decreases.

It will be clear from the results of Table 1 that the magnetoresistive elements (Samples No. 1 to No. 5) of the present invention have changes in the resistance change ratio of above 4% and good magnetic properties and are excellent in terms of a change in the resistance change ratio compared with the prior art magnetoresistive elements (Samples No. 6 and No. 7). In particular, Samples No. 1, No. 2 and No. 4 exhibit good magnetic field sensitivities at some 10 Oe of saturation field and outputs as high as 6–7% of change in the resistance change ratio.

Figure 14:
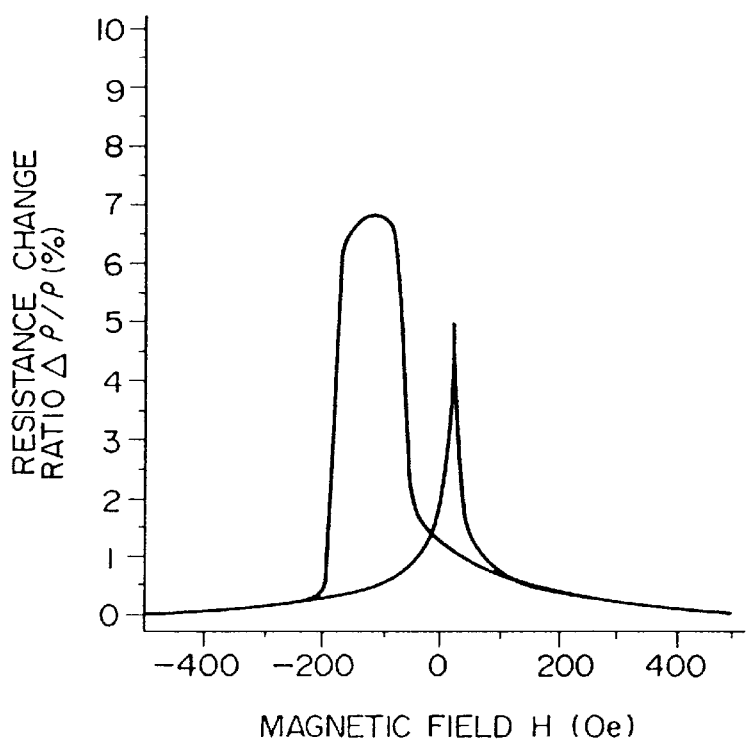
FIG. 14 shows a relationship between a magnetic field and a resistance change ratio in an NiO/Co/Cu/Co film structure.
Figure 15:
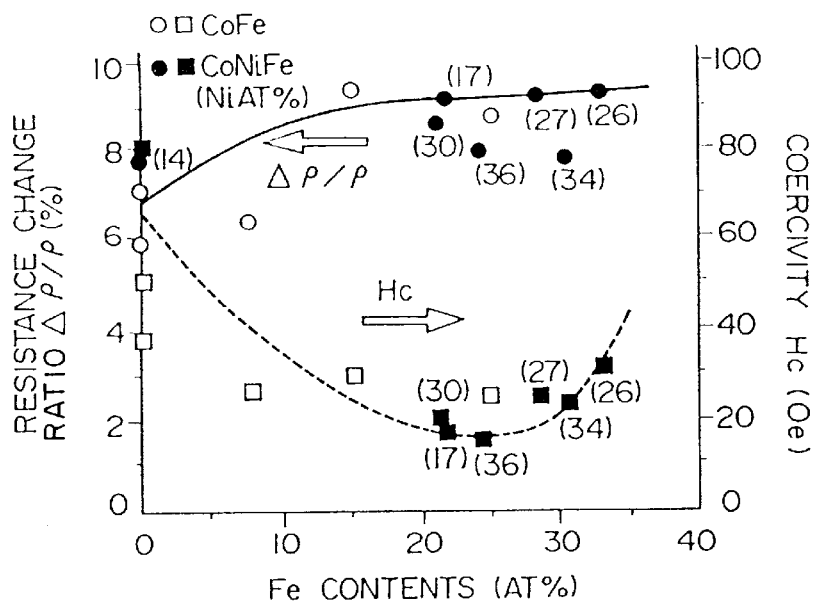
FIG. 15 shows the resistance change ratio and a coercivity when Ni and Fe are added to a Co film.
Figure 16:
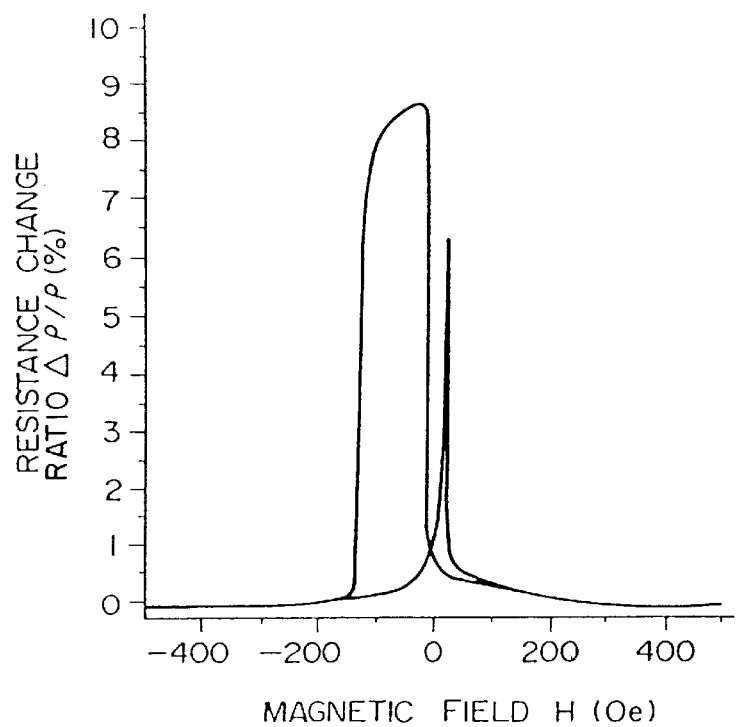
FIG. 16 shows a relationship between a magnetic field and a resistance change ratio in an NiO/CoNiFe/Cu/NiFe/Cu/CoNiFe/NiO film structure.

Shown in FIG. 14 is a resistance change ratio curve of an NiO/Co/Cu/Co layered structure with the magnetic films made of Co. A hysteresis loop caused by the coercivity of the Co film could be observed in the vicinity of zero magnetic field, but the change in the resistance change ratio was 7% which is about twice the change in the resistance change ratio when NiFe was used in the same structure. FIG. 15 shows a relationship between the resistance change ratio and the coercivity corresponding to the field sensitivity when Ni and Fe are added to the Co. When the same film structure is employed and the Co film is made of pure Co, the change in the resistance change ratio is 7% and the field sensitivity is 50 Oe, whereas when the Co film is made of an alloy of Co and Ni and Fe, the change in the resistance change ratio and the field sensitivity can be both improved. It is also acceptable to use an NiFe film simultaneously with a CoNiFe film. FIG. 16 shows a resistance change ratio curve of a $Co_{51}Ni_{27}Fe_{22}/Cu/NiFe/Cu/Co_{51}Ni_{27}Fe_{22}/NiO$ layered structure, which has an output of more than an 8% change in the resistance change ratio and a high field sensitivity in the vicinity of zero magnetic field. In this way, an NiFe or CoNiFe/Cu layered structure having an NiO antiferromagnetic film formed on a base as an underlayer film has a very high sensitivity as a magnetoresistive film.

Figure 17:
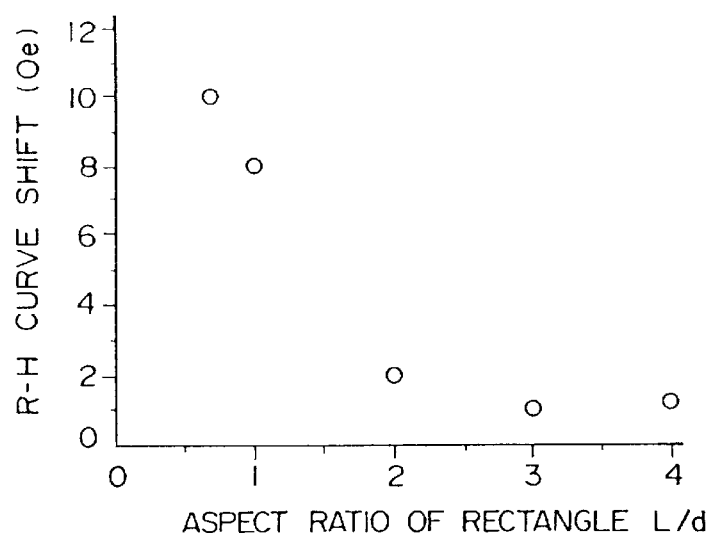
FIG. 17 shows a relationship between an aspect ratio between an element width and an MR height and a shift of a resistance curve in a magnetoresistive element.

FIG. 17 shows a relationship between an aspect ratio between MR height d and element width L and a shift of a resistance change ratio curve from zero magnetic field when an NiO/NiFe/Cu/NiFe/Cu/NiFe/NiO layered structure is formed into a rectangular shape which has an MR height d of 10 μm and an element width L of 7 to 40 μm. An MR width w between electrodes was set to be 5 μm. When the element has an aspect ratio of the long axis length L of the rectangle to the short axis length d thereof of 2 or greater, the shape anisotropy of the structure of the magnetic film acts to direct its relatively easy rotating magnetization in the long axis direction and to direct the magnetizations of the magnetic films having different bias fields in mutually different directions, which results in the shift being reduced and the element having a wide output range with respect to positive and negative magnetic fields.

Figure 18:
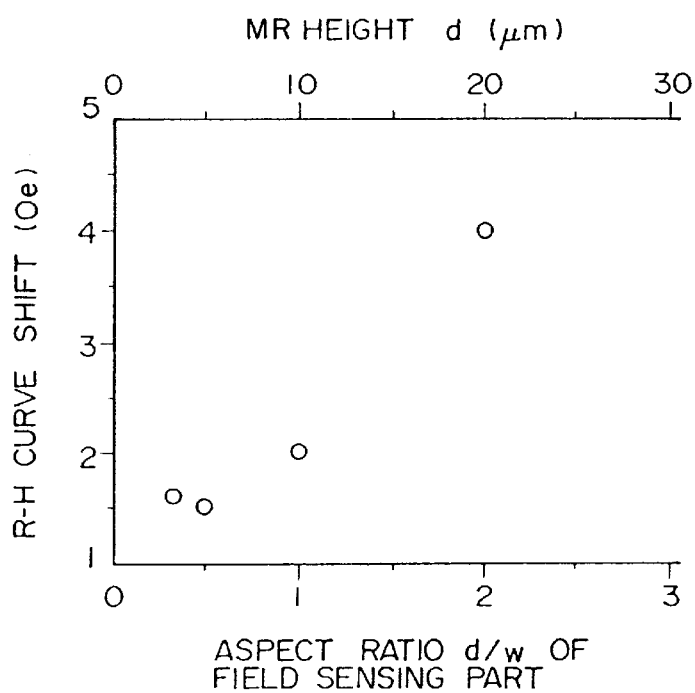
FIG. 18 shows a relationship between an aspect ratio between the MR height and an element width between electrodes and a shift of a resistance curve in a magnetoresistive element.

FIG. 18 shows a relationship between an aspect ratio between MR height d and MR width w and a shift of a resistance change ratio curve from zero magnetic field when an NiO/NiFe/Cu/NiFe/Cu/NiFe/NiO layered structure is formed into a rectangular shape which has an MR height d of 4 to 20 μm, an element width L of 20 μm and an MR width w of 10 μm. It will be seen from the drawing that, with respect to the shape of a field sensing part of the magnetoresistive element, when the MR height d is less than the MR width w, the shift becomes small and thus the element can have a wide output range with respect to positive and negative magnetic fields. In particular, when the MR height d is below 5 μm, the element can have a good reproduction characteristic. It will be appreciated from the results of FIGS. 17 and 18 that, in the magnetoresistive element of the present invention, when the shape of the magnetoresistive element is suitably specified, the effect of the shape anisotropy of the magnetic film can be effectively used as a relatively weak bias.

Figure 19:
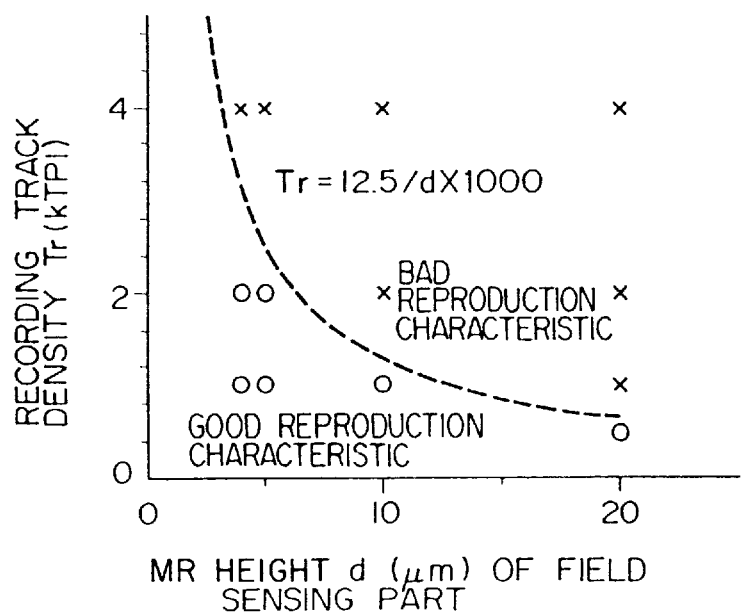
FIG. 19 shows a relationship between the MR height and a recording track density.

Turning to FIG. 19, there are shown reproduction characteristics when reproduction is carried out using various sizes of magnetoresistive elements while varying recording track density. In the figure, good reproduction characteristics are denoted by ○ and bad ones are denoted by X. The MR height d of the read head was set to be constant and to correspond to about 0.7 times the width of a gap part of a recording head, a recording wavelength was set to be 0.8 μm, a peripheral speed was set to be between 5 and 20 m/sec, and reading and writing operations were performed on Co—Cr sputtered media. It was found that a relationship between a recording track density Tr and an MR height d for obtaining a good reproduction characteristic is complementary as illustrated in FIG. 19, and the structure of the magnetic storage/read system of the present invention is acceptable when it satisfies a relationship of $d \leq (12.5 \times 10^3)/Tr$, where d is expressed in μm and Tr is expressed in tracks per inch (TPI).

In this way, the magnetic storage/read system using the present invention is excellent in its reproducing ability and can provide a reproduction output that is 1.5–3 times the reproduction output of the prior art. In particular, its recording density is excellent. For example, when a magnetic storage/read system uses the magnetoresistive element of the present invention in a reproduction head with an MR height of 2 μm, the track density can be as high as 6.25 kTPI. Further, in a small disk device incorporating two 2.5-inch disks and having a recording wavelength of 0.2 μm, a storage capacity of about 0.8 Gb/in$^2$ or 1 Gb/device can be realized.

Although the layered structure has been fabricated by the sputtering process in the present embodiment, the film formation can be carried out by a similar thin-film forming process such as a vacuum evaporation process without deteriorating the characteristics of the layered structure.

Further, the bias of the magnetic film has been effected with use of an antiferromagnetic film, but other suitable biasing systems may be employed to apply anisotropy and it is also possible to use the bias film as an underlayer film. Similarly, the biasing direction of the magnetic film may be determined not only by an external magnetic field during the film formation as in the present embodiment but also by a field process or in-field heat treatment.

Even when part of the magnetic film is also used as the bias film, substantially the same effects can be obtained.

In order to fabricate a good layered structure, it is preferable that, in the element of the present invention, an underlayer film is formed on the base and the layered structure is formed on the underlayer film. Although the nickel oxide bias film has been used also as the underlayer film in the examples of Table 1, the underlayer film may be made of an oxide other than nickel oxide, an organic compound such as photoresist, or a metal such as Ta, Fe and Nb, and then the layered structure may be formed on the underlayer film without deteriorating the performance of the element of the present invention.

Figure 20:
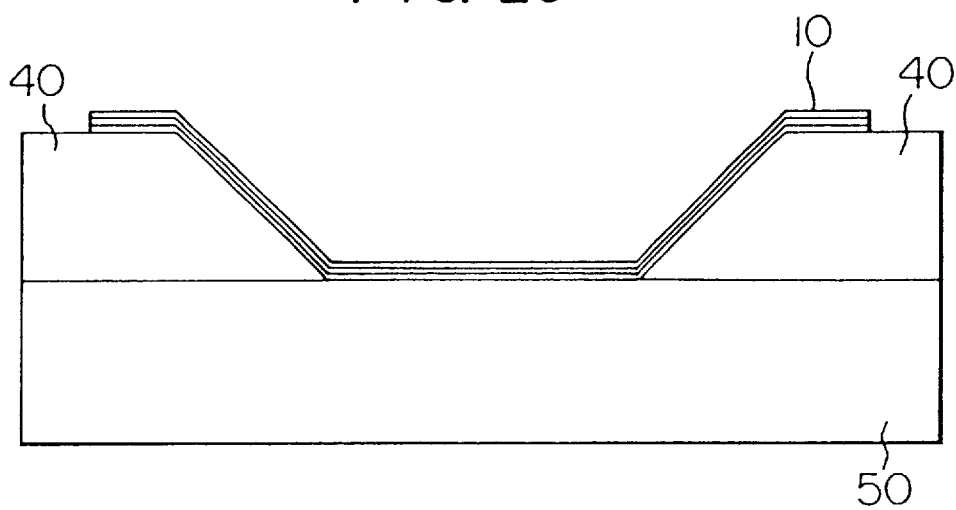
FIG. 20 shows an example of how to prescribe a track width of the magnetoresistive element of the present invention.

FIG. 20 shows another embodiment of the magnetoresistive element of the present invention. In this case, a part of a layered structure 10 providing the magnetoresistive effect wider than the MR width of the field sensing part of the layered structure 10 is formed, for example, on portions of electrodes 40 inclined to the surface of a base 50, thus preventing influences from the adjacent recording tracks and thus improving a so-called off-track characteristic.

Figure 21:
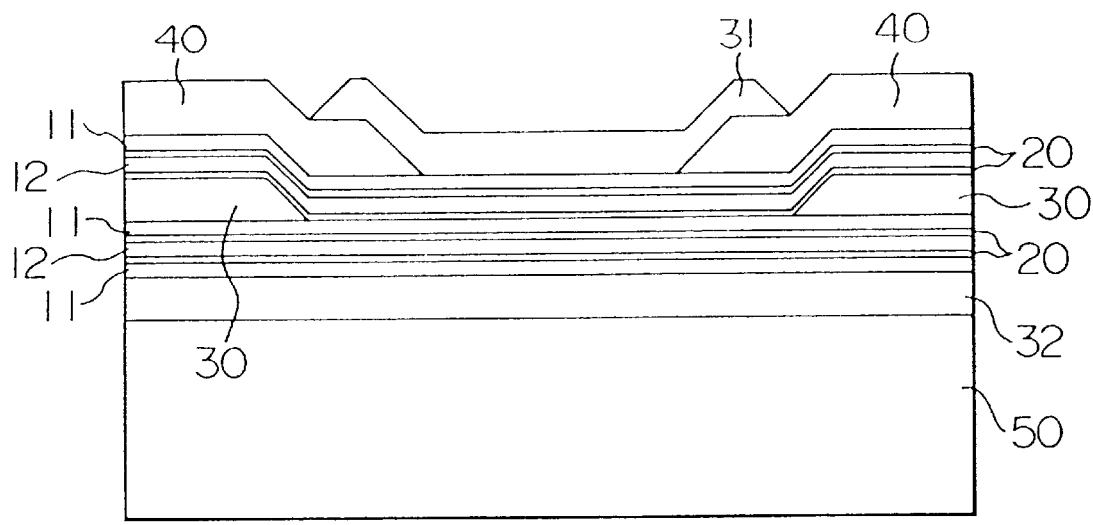
FIG. 21 shows an example where an antiferromagnetic film with its central part removed is used in a magnetoresistive element of the present invention.

Shown in FIG. 21 is another embodiment of the magnetoresistive element of the present invention. In the present embodiment, an antiferromagnetic film 32, a magnetic film 11, a nonmagnetic film 20, a magnetic film 12, a nonmagnetic film 20 and a magnetic film 11 are sequentially formed on a base 50 to form a layered structure; an antiferromagnetic film 30 is formed on the layered structure except on the central part of the layered structure; a nonmagnetic film 20, a magnetic film 12, a nonmagnetic film 20, a magnetic film 11, electrodes 40 and an antiferromagnetic film 31 are sequentially formed on the resultant structure. In this element, exchange coupling bias is generated without causing the central antiferromagnetic film 30 to be electrically insulated from its upper and lower layers. Thus, this element has an effect that the element can prevent electron film surface scattering and can provide a high output.

Figure 22:
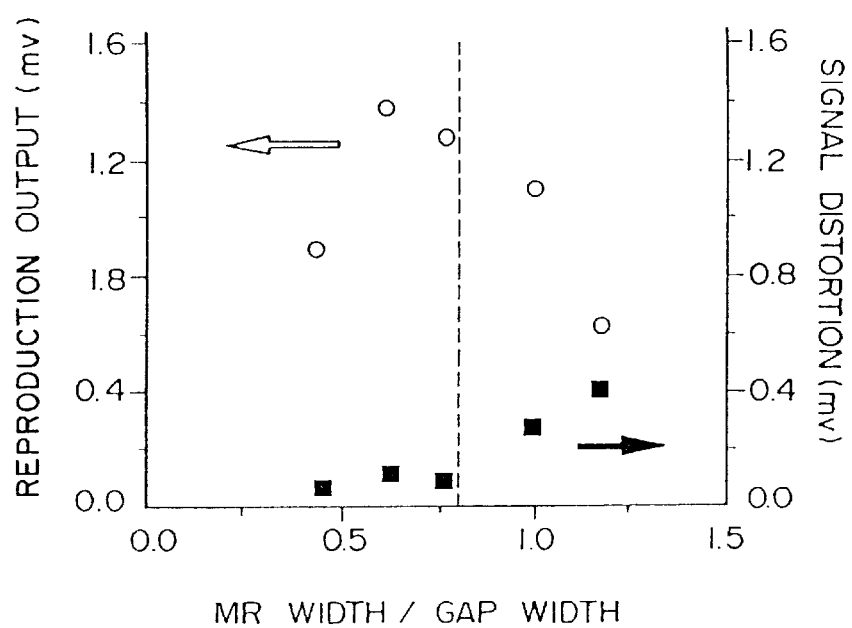
FIG. 22 shows the intensity of a reproduced signal with respect to a ratio between the MR width of an MR head and the gap width of a recording head.

FIG. 22 shows reproduction output and signal distortion when a reproducing head having an MR width of 2.5 to 6 μm and a recording head having a gap width of 5 μm are stacked and their recording and reproducing operations are carried out. When the MR width was less than 0.8 times the gap width, no signal distortion could be detected at the edge of a recording track and a good S/N ratio was obtained. Even when the MR width is as small as 0.4 times the gap width, its reproduction output was sufficient. It has been found from these facts that, when the MR width of the reproduction head is smaller than the gap width of the recording head, the write/read separation type head and magnetic storage/read system of the present invention can have an effective reproduction output.

Figure 23:
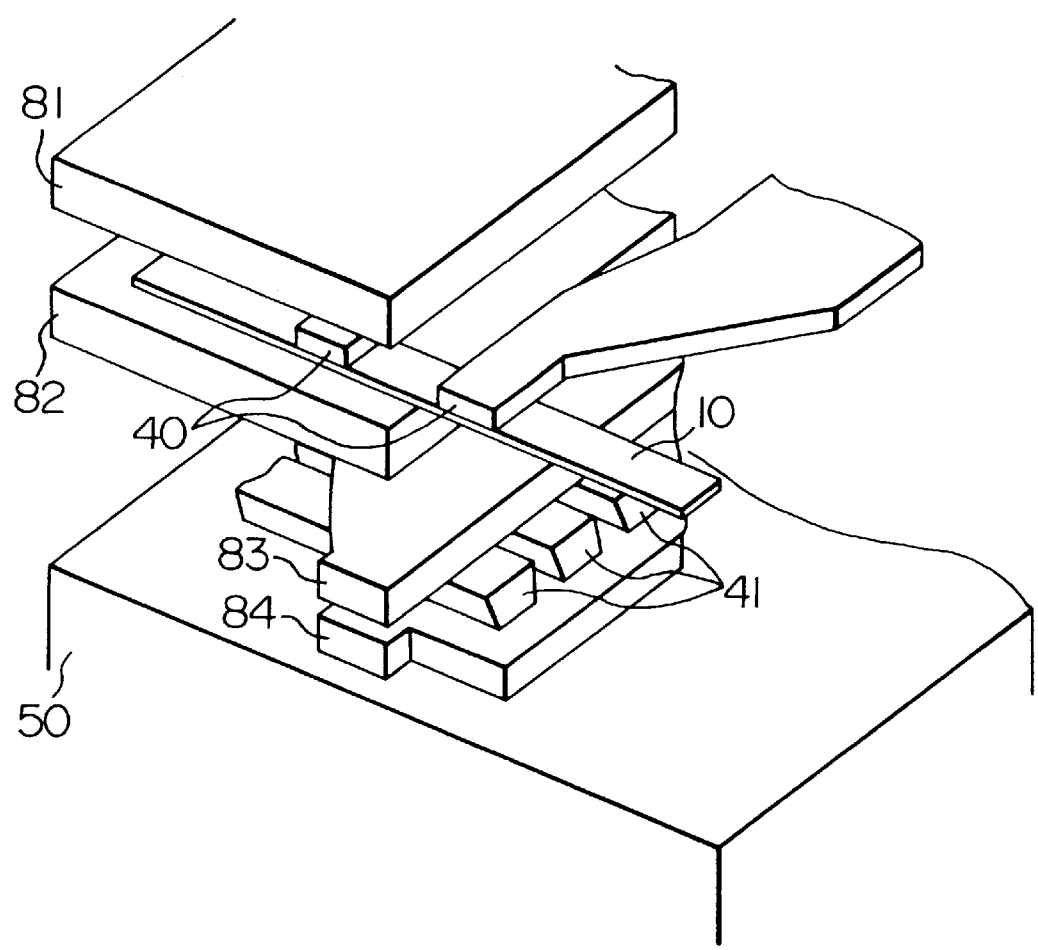
FIG. 23 schematically shows a thin-film magnetic head in which a write head is first formed on a base and then a reproducing head is formed on the write head.

FIG. 23 shows another embodiment of the structure of the thin-film magnetic head in the magnetic storage/read system of the present invention. More specifically, lower and upper magnetic films 84 and 83 and a coil 41 provided therebetween for applying a magnetomotive force are provided on a base 50 to form a recording head, a lower shield film 82 is formed on the recording head, and subsequently a magnetoresistive film 10, electrodes 40 and an upper shield film 81 are sequentially formed thereon. Since the magnetoresistive film which has a relatively delicate structure is formed on top of the recording head after the recording head has been formed, the magnetoresistive film is not subjected to the mechanical and thermal stresses associated with forming the recording head and alignment of the reproducing head with the recording head is facilitated, and the accuracy of the magnetic storage/read system in the track width direction can be improved and its productivity can be enhanced.

Figure 24:
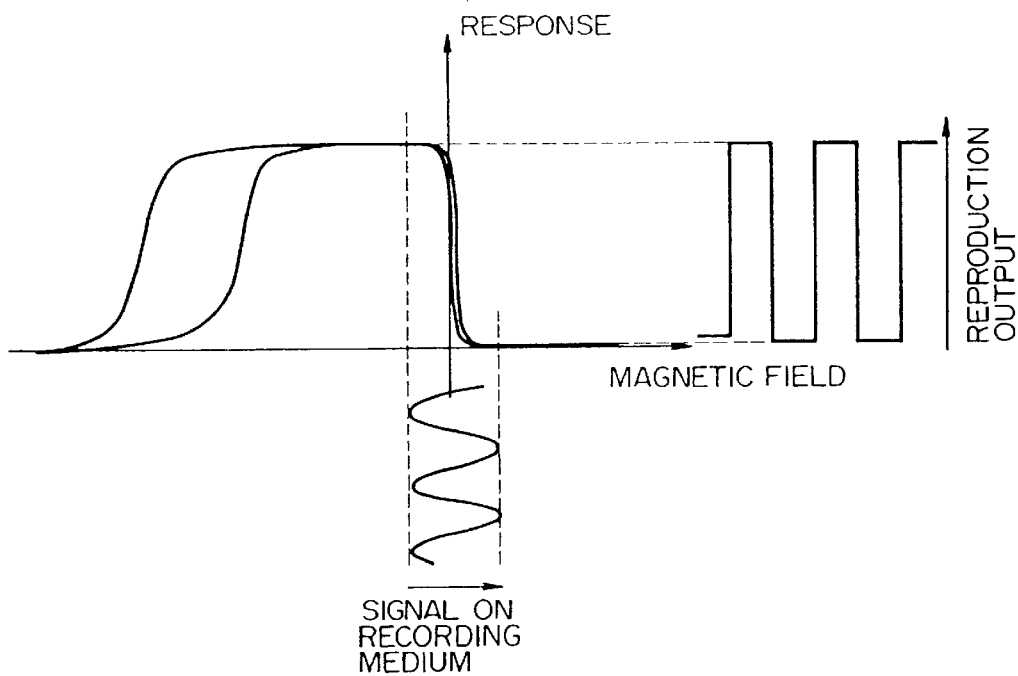
FIG. 24 is a diagram for explaining the operation of a magnetic storage/read system of an analog-to-digital conversion type in accordance with the present invention.

Shown in FIG. 24 is a schematic diagram for explaining the operation of an analog-to-digital conversion function used in the magnetic storage/read system of the present invention. In the drawing, a central curve indicates a response of the magnetoresistive element of the present invention to an external magnetic field, a lower sine waveform represents a recording signal on a recording medium, and a right-side rectangular waveform represents a reproduction output of the magnetoresistive element of the present invention when reproducing the recording signal. Since the field sensitivity of the magnetoresistive element of the invention is sensitive to the amplitude of a magnetic field from the recording medium and has a step shape, the element can generate an output responsive to an analog signal on the recording medium directly as a digital signal. For this reason, its S/N ratio can be improved and thus its signal processing circuit can be simplified.

Figure 25:
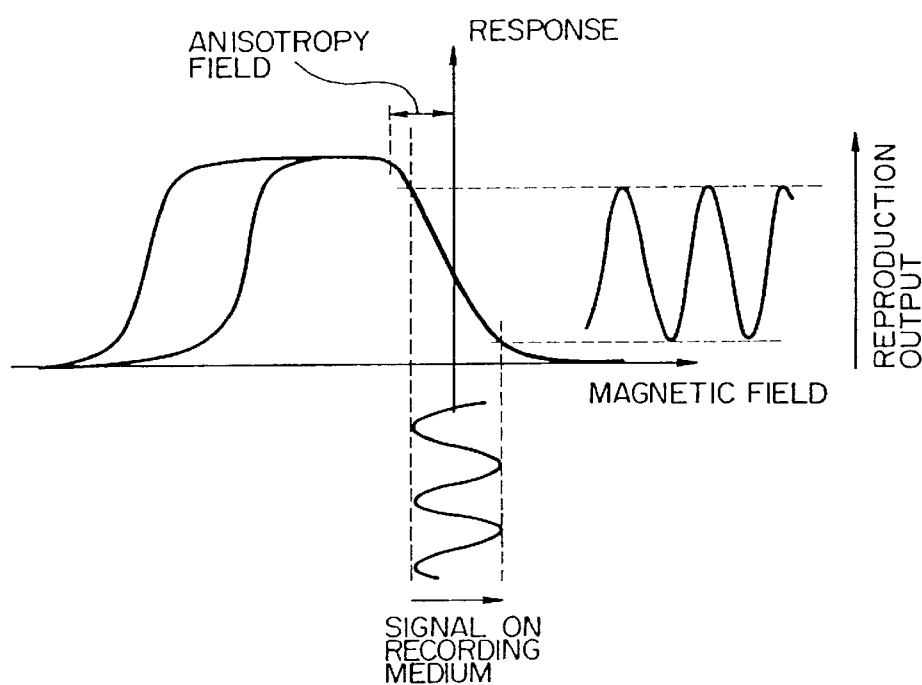
FIG. 25 is a diagram for explaining the operation of a magnetic storage/read system of an analog-to-analog conversion type in accordance with the present invention.

FIG. 25 is a schematic diagram for explaining the operation of an analog/analog reproducing apparatus based on the present invention. In the drawing, a central curve indicates a response of the magnetoresistive element of the present invention to an external magnetic field. Since suitable anisotropy is applied to the magnetic films in the magnetoresistive element, the output range of the element is expanded. In the drawing, a lower sine waveform represents a recording signal on a recording medium, and a right-side sine waveform represents a reproduction output of the magnetoresistive element of the present invention when reproducing the recording signal. Since the applied anisotropy causes the field sensitivity of the magnetoresistive element of the invention to be continuous and linear to the amplitude of a magnetic field from the recording medium, the element can respond to an analog signal on the recording medium and can output a signal of an identical shape with good linearity and reproducibility. As a result, a reproducing apparatus having a good reproducibility can be realized by selecting a suitable anisotropy according to the characteristics of the recording medium and a proximity distance between the reproducing head and recording medium.

As has been detailed in the foregoing, in accordance with the present invention, there can be obtained a magnetic storage/read system which has a high recording density and also a magnetoresistive element which has a good sensitivity and a high reproduction output.

What is claimed is:

1. A magnetoresistive element comprising:

a first antiferromagnetic film;

a first magnetic film having a magnetization direction which is fixed by magnetic coupling with the first antiferromagnetic film;

a second antiferromagnetic film;

a second magnetic film having a magnetization direction which is fixed by magnetic coupling with the second antiferromagnetic film;

a third magnetic film having a magnetization direction which is able to rotate in response to an applied magnetic field;

a first nonmagnetic film disposed between the first magnetic film and the third magnetic film; and a second nonmagnetic film disposed between the second magnetic film and the third magnetic film;

wherein the third magnetic film is disposed between the first nonmagnetic film and the second nonmagnetic film, the first magnetic film is disposed between the first antiferromagnetic film and the first nonmagnetic film, and the second magnetic film is disposed between the second antiferromagnetic film and the second nonmagnetic film.

2. A magnetoresistive element according to claim 1, wherein a magnetic resistance of the magnetoresistive element varies in accordance with (1) an angle between the magnetization direction of the first magnetic film and the magnetization direction of the third magnetic film, and (2) an angle between the magnetization direction of the second magnetic film and the magnetization direction of the third magnetic film.

3. A magnetoresistive element according to claim 2, wherein the magnetoresistive element has a magnetic resistance which is detectable by applying a current to the magnetoresistive element.

4. A magnetoresistive element according to claim 3, further comprising a pair of electrodes for applying a current to the magnetoresistive element to detect the magnetic resistance of the magnetoresistive element.

5. A magnetoresistive element according to claim 1, wherein the third magnetic film includes a multilayered film.

6. A magnetoresistive element according to claim 5, wherein the multilayered film includes a Co layer, an NiFe layer, and a Co layer.

7. A magnetoresistive element according to claim 1, wherein each of the first nonmagnetic film and the second nonmagnetic film includes Cu.

8. A magnetoresistive element according to claim 1, wherein each of the first magnetic film and the second magnetic film is a single-layer film.

* * * * *